`US011978922B2`

United States Patent
Lim et al.

(10) Patent No.: US 11,978,922 B2
(45) Date of Patent: May 7, 2024

(54) SEPARATOR STRUCTURE FOR SECONDARY BATTERY, METHOD FOR MAKING THE SEPARATOR, AND THE SECONDARY BATTERY USING THE SAME

(71) Applicant: LG ELECTRONICS INC., Seoul (KR)

(72) Inventors: Eunja Lim, Seoul (KR); Hongcheol Lee, Seoul (KR); Eunseck Kang, Seoul (KR); Juchul Lee, Seoul (KR); Koun Park, Seoul (KR); Misun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 17/319,930

(22) Filed: May 13, 2021

(65) Prior Publication Data
US 2021/0359375 A1    Nov. 18, 2021

(30) Foreign Application Priority Data

May 15, 2020   (KR) .................. 10-2020-0058386
May 15, 2020   (KR) .................. 10-2020-0058406
Mar. 19, 2021  (KR) .................. 10-2021-0036209

(51) Int. Cl.
*H01M 50/429*    (2021.01)
*H01M 50/403*    (2021.01)
(Continued)

(52) U.S. Cl.
CPC ..... *H01M 50/4295* (2021.01); *H01M 50/403* (2021.01); *H01M 50/431* (2021.01); *H01M 50/449* (2021.01)

(58) Field of Classification Search
CPC .. B01D 67/0093; B01D 71/10; C09D 101/08; H01M 50/403; H01M 50/4295;
(Continued)

(56) References Cited

U.S. PATENT DOCUMENTS

2011/0104573 A1*  5/2011  Gogichev ............... H01M 6/04
                                                    429/303
2019/0237731 A1*  8/2019  Park ..................... H01M 50/457

FOREIGN PATENT DOCUMENTS

JP    2014232845    12/2014
JP    2018063926    4/2018
(Continued)

OTHER PUBLICATIONS

JP-2018106865-A English machine translation (Year: 2018).*
(Continued)

*Primary Examiner* — Scott J. Chmielecki
(74) *Attorney, Agent, or Firm* — LEE, HONG, DEGERMAN, KANG & WAIMEY

(57) ABSTRACT

The present disclosure is applicable to the technical field related to a secondary battery, and relates to, for example, a separator structure for the secondary battery, a method for preparing the same, and the secondary battery using the same. A separator structure disposed inside a secondary battery includes a porous support body including a first face and a second face, and a cellulose nano fiber subjected to an ionic surface treatment located on at least one of the first face and the second face of the support body.

28 Claims, 31 Drawing Sheets

(51) Int. Cl.
*H01M 50/431* (2021.01)
*H01M 50/449* (2021.01)

(58) Field of Classification Search
CPC .. H01M 50/44; H01M 50/446; H01M 50/449;
H01M 50/489; Y02P 70/50
See application file for complete search history.

(56) References Cited

FOREIGN PATENT DOCUMENTS

| | | | |
|---|---|---|---|
| JP | 2018106865 | | 7/2018 |
| JP | 2018106865 A | * | 7/2018 |
| KR | 1020120108686 | | 10/2012 |
| KR | 1020160043768 | | 4/2016 |
| KR | 1020210038490 | | 4/2021 |

OTHER PUBLICATIONS

PCT International Application No. PCT/KR2021/005884, International Search Report dated Aug. 31, 2021, 10 pages.
Korean Intellectual Property Office Application No. 10-2021-0036209, Prior Art Search Report dated Mar. 23, 2021, 114 pages.

* cited by examiner

SEPARATOR STRUCTURE FOR SECONDARY BATTERY, METHOD FOR MAKING THE SEPARATOR, AND THE SECONDARY BATTERY USING THE SAME

CROSS-REFERENCE TO RELATED APPLICATIONS

Pursuant to 35 U.S.C. § 119(a), this application claims the benefit of earlier filing date and right of priority to Korean Patent Application No. 10-2020-0058386, filed on May 15, 2020, 10-2020-0058406, filed on May 15, 2020, and 10-2021-0036209, filed on Mar. 19, 2021, the contents of which are all hereby incorporated by reference herein in their entireties.

BACKGROUND OF THE DISCLOSURE

Field of the Disclosure

The present disclosure is applicable to the technical field related to a secondary battery, and relates to, for example, a separator structure for the secondary battery, a method for preparing the same, and the secondary battery using the same.

Discussion of the Related Art

Secondary batteries including a lithium-ion battery require a relatively high operating temperature range compared to other batteries because a temperature thereof rises as a state of being continuously charged/discharged is maintained while being used.

In particular, secondary batteries for a vehicle including the lithium-ion battery require a higher operating temperature range because an amount of charge/discharge is relatively greater than that of other batteries as a high capacity and a high output are required. Therefore, a separator used in such secondary batteries for the vehicle is required to have higher heat resistance and thermal stability than those required by a normal separator.

When a temperature of a polyolefin-based separator fabric increases because of a battery operation, thermal contraction may occur, resulting in battery explosion resulted from a short circuit between positive and negative electrodes. Therefore, currently, a scheme of coating an active layer (inorganic particles+polymer binder) on a polyolefin-based separator support body is mainly used to enhance the heat resistance of the separator.

According to the prior art, the polymer binder is used to secure adhesion between the inorganic particles and the polyolefin-based separator support body. Because of deterioration of the polymer binder at a high temperatures, the inorganic particles are eliminated, so that there is a limit in terms of thermal contraction at a temperature equal to or higher than 150° C. Therefore, mechanical properties such as the adhesion of the inorganic particles is also important.

As such, it is necessary to improve the heat resistance and mechanical properties of the secondary battery separator in order to realize a high energy density and a large-sized battery.

SUMMARY OF THE DISCLOSURE

The present disclosure is to provide a separator structure, a method for preparing the same, and a secondary battery using the same that may significantly reduce a thermal contraction percentage at a high temperature and thus improve heat resistance, and at the same time realize a function of closing (shut down) the separator.

In addition, the present disclosure intends to provide a separator structure, a method for preparing the same, and a secondary battery using the same that may secure adhesion between a support body and a coating layer In addition, the present disclosure is to provide a separator structure, a method for preparing the same, and a secondary battery using the same that may be harmless to an environment and may be prepared in a low-temperature aqueous solution.

A first aspect of the present disclosure provides a separator structure disposed inside a secondary battery including a porous support body including a first face and a second face, and a cellulose nano fiber subjected to an ionic surface treatment located on at least one of the first face and the second face of the support body.

In one implementation, the cellulose nano fiber subjected to the ionic surface treatment may be a cellulose nano fiber with an ionic functional group given thereto.

In one implementation, the ionic functional group may improve affinity between the cellulose nano fiber and the support body.

In one implementation, a reaction amount of the ionic functional group to the cellulose nano fiber may be in a range from 5 to 30%.

In one implementation, the separator structure may further contain inorganic particles at least partially in contact with the cellulose nano fiber.

In one implementation, the inorganic particles may form a network with the cellulose nano fiber.

In one implementation, the inorganic particles may include at least one selected from a group consisting of $Al_2O_3$, $BaTiO_3$, $SiO_2$, $TiO_2$, and $SnO_2$.

In one implementation, the cellulose nano fiber subjected to the ionic surface treatment may have a positive ion group, a negative ion group, or a zwitterionic group.

In one implementation, the positive ion group may include an amine group.

In one implementation, the negative ion group may include a carboxyl group.

In one implementation, the separator structure may further contain a binder for attaching the cellulose nano fiber on at least one of the first face and the second face of the support body.

In one implementation, the cellulose nano fiber may have a crystallinity in a range from 40 to 60%.

A second aspect of the present disclosure provides a separator structure including a support body having at least one face coated with a dry coating composite, wherein the dry coating composite contains 1 to 10 wt % of a cellulose nano fiber with an ionic functional group given thereto, inorganic particles having a permittivity constant equal to or higher than 5, and a binder.

A third aspect of the present disclosure provides a secondary battery including a positive electrode, a negative electrode, a separator including a porous support body positioned between the positive electrode and the negative electrode and including a first face and a second face, and a cellulose nanofiber subjected to an ionic surface treatment positioned on at least one of the first and second faces of the support body, and electrolytes respectively located between the positive electrode and the separator and between the negative electrode and the separator.

A fourth aspect of the present disclosure provides a method for preparing a separator includes obtaining a coating solution composite containing a cellulose nanofiber with an ionic functional group given thereto, inorganic particles having a permittivity constant equal to or higher than 5, and a binder, and coating the coating solution composite on a support body.

DESCRIPTION OF SPECIFIC EMBODIMENTS

Figure 1:
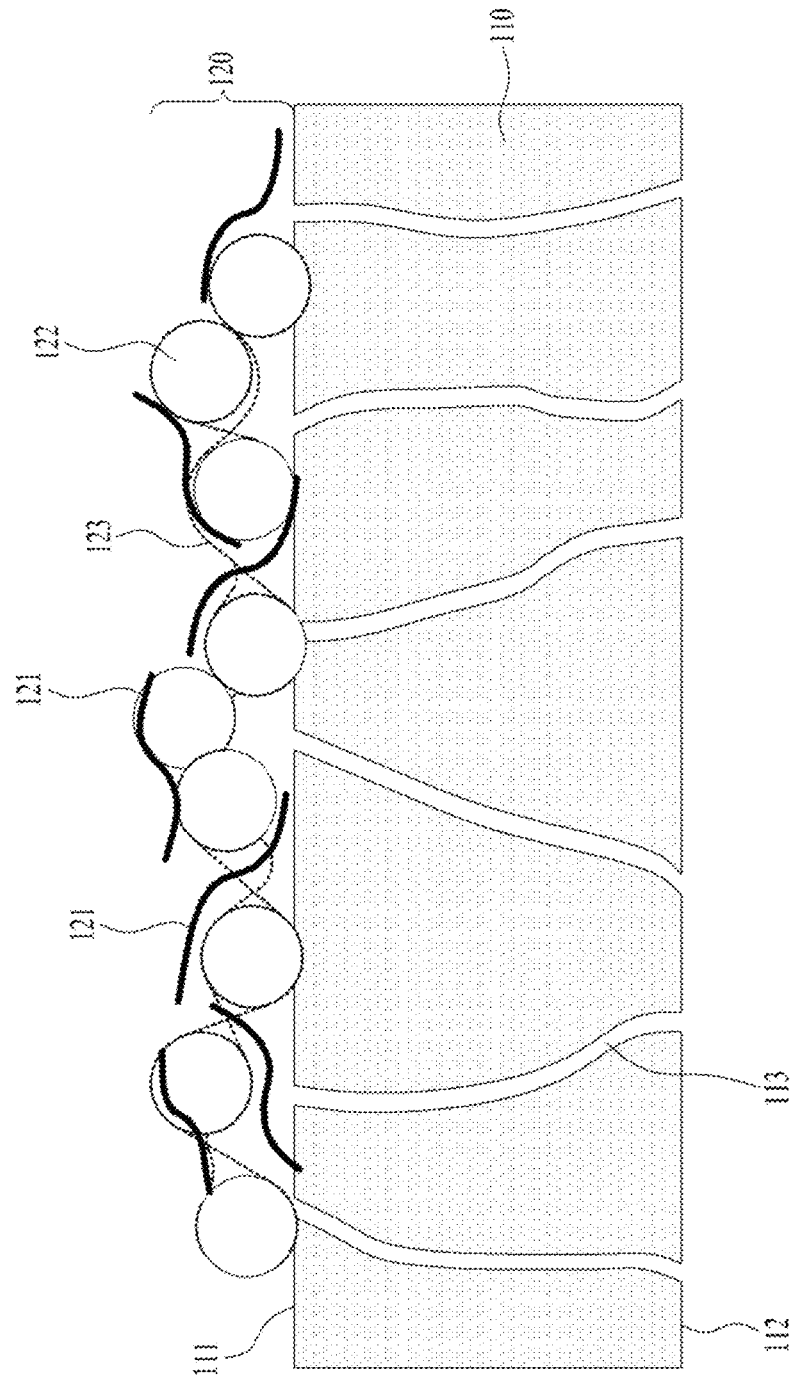
FIG. 1 is a schematic diagram showing a portion of a separator structure according to an embodiment of the present disclosure.

Hereinafter, embodiments disclosed herein will be described in detail with reference to the accompanying drawings. Regardless of reference numerals, the same or similar components are assigned the same reference numerals, and redundant descriptions thereof will be omitted. The suffixes "module" and "unit" for components to be used in the following description are given or used interchangeably in consideration of only the ease of writing of the specification, and do not have distinct meanings or roles by themselves. In addition, in describing the embodiments disclosed in this specification, when it is determined that a detailed description of a related known technology may obscure the gist of the embodiments disclosed herein, the detailed description thereof will be omitted. In addition, it should be noted that the accompanying drawings are only for easy understanding of the embodiments disclosed in this specification, and the technical spirit disclosed in this specification should not be interpreted as being limited by the accompanying drawings.

Furthermore, although each drawing is described for convenience of description, it is also within the scope of the present disclosure for those skilled in the art to implement another embodiment by combining at least two drawings.

In addition, when a component such as a layer, a region, or a substrate is referred to as being "on" another component, it will be understood that the component may be directly on another component or there may be intermediate elements therebetween.

FIG. 1 is a schematic diagram showing a portion of a separator structure according to an embodiment of the present disclosure. FIG. 1 shows a separator structure that may be disposed inside a secondary battery such as a lithium-ion battery.

Referring to FIG. 1, a structure of a separator 100 may include a porous support body 110 including a first face 111 and a second face 112, and a cellulose nano fiber 121 located on at least one of the first face 111 and the second face 112 of the support body 110.

In this connection, the support body 110 may be a porous base (fabric) having a plurality of holes 113 extending from the first face 111 to the second face 112 or may include such a porous base (fabric).

Specifically, such support body 110 may be a porous film in which one type of polyolefin (PO) (such as polyethylene (PE), polypropylene (PP), and the like)-based polymer resin exists or different types of polyolefin (PO)-based polymer resin are mixed with each other.

Because the polyolefin (PO) itself may have poor heat resistance and mechanical strength, the support body 110 may include an oxide coating (not shown).

Such support body 110 may be divided into a wet type and a dry type based on a manufacturing process. A wet membrane, which elongates and expands pores generated when a plasticizer added in a process of forming a separator is extracted with an organic solvent, has excellent strength, elasticity and thickness, pore uniformity, and the like. In one example, a dry membrane, which is a scheme of generating micro-cracks on a crystal interface by elongating an extruded film at a low temperature, may have a multi-layer structure including the PP/PE/PP.

The cellulose nano fiber (CNF) 121 may be positioned on the support body 110. The cellulose nano fiber 121 may constitute a coating layer 120.

The cellulose nano fiber 121 is a crystalline polymer that is a major component of a plant cell wall, and is a fiber-shaped nanomaterial having a diameter equal to or smaller than 100 nm. Such cellulose nano fiber 121 has very excellent thermal stability because the cellulose nano fiber 121 has a low coefficient of thermal expansion equal to or lower than 10 ppm/K while exhibiting high strength comparable to that of glass fiber.

In addition, the cellulose nanofiber (CNF) 121 that has been subjected to an ionic surface treatment may be used for the structure of the separator 100. The ionic surface-treated cellulose nano fiber 121 may have an ionic functional group added to the cellulose nano fiber 121.

Hereinafter, the cellulose nano fiber 121 described in the present specification may refer to the cellulose nano fiber 121 that has been subjected to the ionic surface treatment, that is, to which the ionic functional group has been added. This will be described in detail later.

Such an ionic functional group may impart hydrophilicity to the cellulose nano fiber 121. In addition, the ionic functional group may improve affinity between the cellulose nano fiber 121 and the support body 110. Accordingly, adhesion of the cellulose nano fiber 121 or the coating layer 120 containing the same may be enhanced.

In addition, peel strength may be improved by the cellulose nano fiber 121 to which such an ionic functional group is added. The peel strength is also referred to as splitting resistance, and means strength of adhesive bonding. For example, this means a force acting per unit width required to separate a material bound to an object.

The coating layer 120 containing the cellulose nano fiber 121 may have durability up to 200° C.

In one example, the cellulose nano fiber 121 that has been subjected to the ionic surface treatment may have a positive ion group, a negative ion group, or an amphoteric ion group.

In this connection, the positive ion group may include an amine group. Specifically, the positive ion group may include diethylethanolamine (DEAE), epoxypropyltrimethylammonium chloride (EPTMAC), and the like.

In addition, the negative ion group may include a carboxyl group. Specifically, the negative ion group may include chloroacetic acid, TEMPO ((2,2,6,6-Tetramethylpiperidin-1-yl)oxyl, (2,2,6,6-tetramethylpiperidin-1-yl)oxidanyl), or the like.

The zwitterionic group may include such a positive ion group and a negative ion group in combination. That is, the zwitterionic group may include at least one of the positive ion groups and at least one of the negative ion groups as exemplified above.

An amount of reaction of the ionic functional group to the cellulose nano fiber 121 may be in a range from 5 to 30%.

The cellulose nano fiber 121 may constitute the coating layer 120 and may be attached to at least one face of the support body 110. To this end, the coating layer 120 may contain a binder 123. That is, the coating layer 120 may contain the binder 123 for attaching the cellulose nano fiber 121 to at least one of the first face 111 and the second face 112 of the support body 110.

In this connection, the binder 123 may be a water-based or oil-based binder. For example, as the water-based binder, acrylic, PVA, PVP, PVO, SBR/CMC, and the like-based binders may be used. Such water-based binder may have a content in a range from 0.5 to 30 wt % based on the coating layer 120.

As another example, as the oil-based binder, a PVDF-based binder may be used. Such oil-based binder may have a content in a range from 5 to 50 w % based on the coating layer 120.

As an embodiment, the cellulose nano fiber 121 may be used alone for the coating layer 120 of the support body 110. In this case, the coating layer 120 may contain the cellulose nano fiber 121 and the binder 123. Such embodiment (a fourth embodiment) will be described later.

As such, when the cellulose nano fiber 121 is used alone for the coating layer 120, the cellulose nano fiber 121 may have a content in a range from 80 to 100 wt % (a weight ratio) based on a total weight of the coating layer 120.

In one example, the coating layer 120 may contain inorganic particles 122 at least partially in contact with the cellulose nano fiber 121. Such inorganic particles 122 may improve the heat resistance of the entire structure of the separator 100.

In this connection, the cellulose nano fiber 121 on a fiber may form a random network structure and connect the inorganic particles 122 to each other to prevent the inorganic particles 122 from being separated.

As a result, performances such as thermal contraction characteristics, mechanical strength, and the like of the separator 100 may be ameliorated.

For example, the inorganic particles 122 may form the network structure with particles of the cellulose nano fiber 121. As another example, the inorganic particles 122 may form a separate layer from the cellulose nano fiber 121.

Such inorganic particles 122 may include at least one of $Al_2O_3$, $BaTiO_3$, $SiO_2$, $TiO_2$, and $SnO_2$. In addition, the inorganic particles 122 may include an inorganic powder having a permittivity equal to or higher than 5.

In one example, in order to secure the heat resistance of the separator 100 containing the cellulose nano fiber 121, crystallinity control of the cellulose nano fiber 121 may be required. The crystallinity of the cellulose nano fiber 121 may be in a range from 40 to 60%.

As described above, the coating layer 120 may be positioned on at least one face of the support body 110 to form the structure of the separator 100. In other words, at least one face of the support body 110 may be coated with a (dry) coating composite to form the structure of the separator 100.

In this connection, the coating layer 120 may have a thickness in a range from 0.5 to 20 μm.

In this connection, the dry coating composite may contain the cellulose nano fiber 121 to which the ionic functional group is added of the content in the range from 80 to 100 wt % (the weight ratio), the inorganic particles 122 having the permittivity equal to or higher than 5, and the binder 123.

Figure 2:
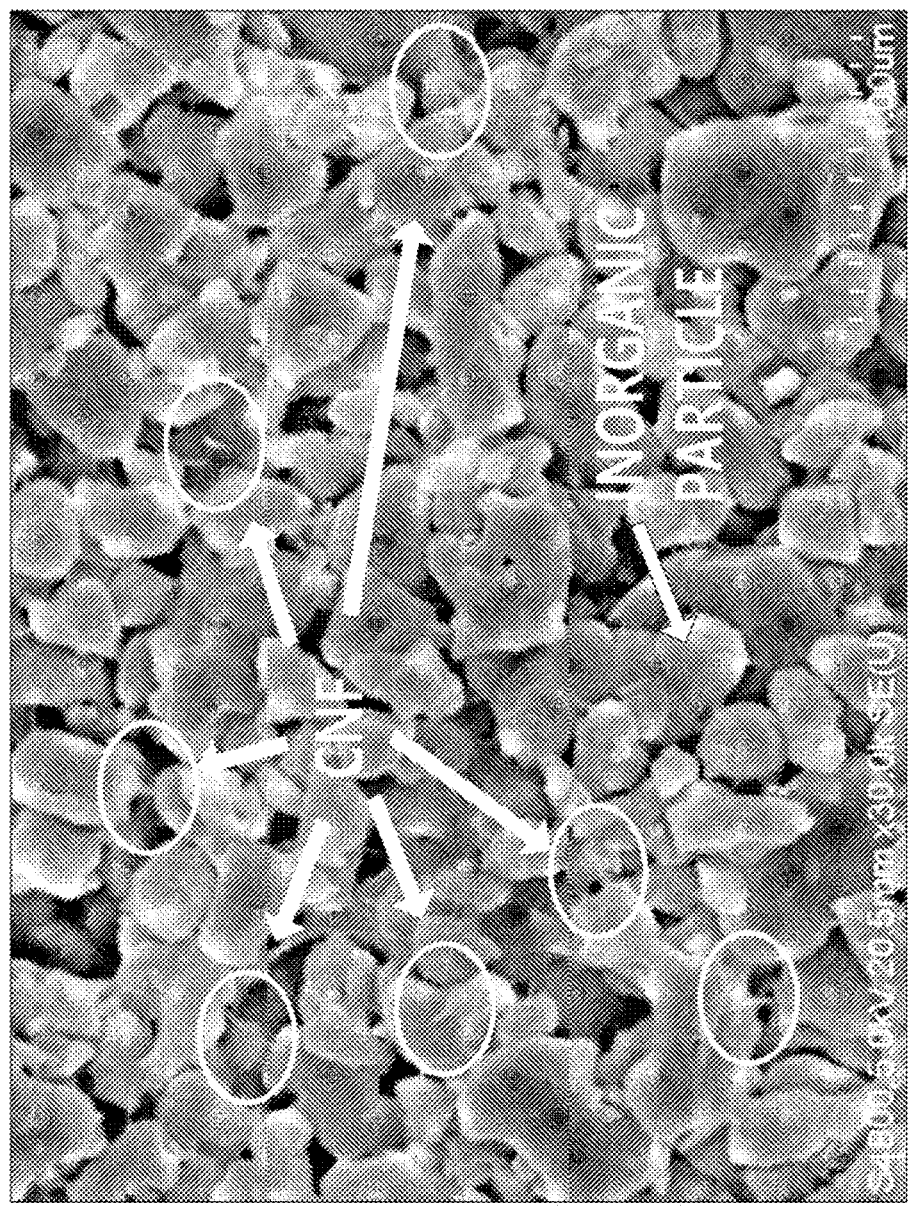
FIG. 2 is an SEM photograph showing a plane of a separator structure according to an embodiment of the present disclosure.

FIG. 2 is an SEM photograph showing a plane of a separator structure according to an embodiment of the present disclosure. In addition, FIG. 3 is an SEM photograph showing a cross-section of a separator structure according to an embodiment of the present disclosure.

Figure 3:
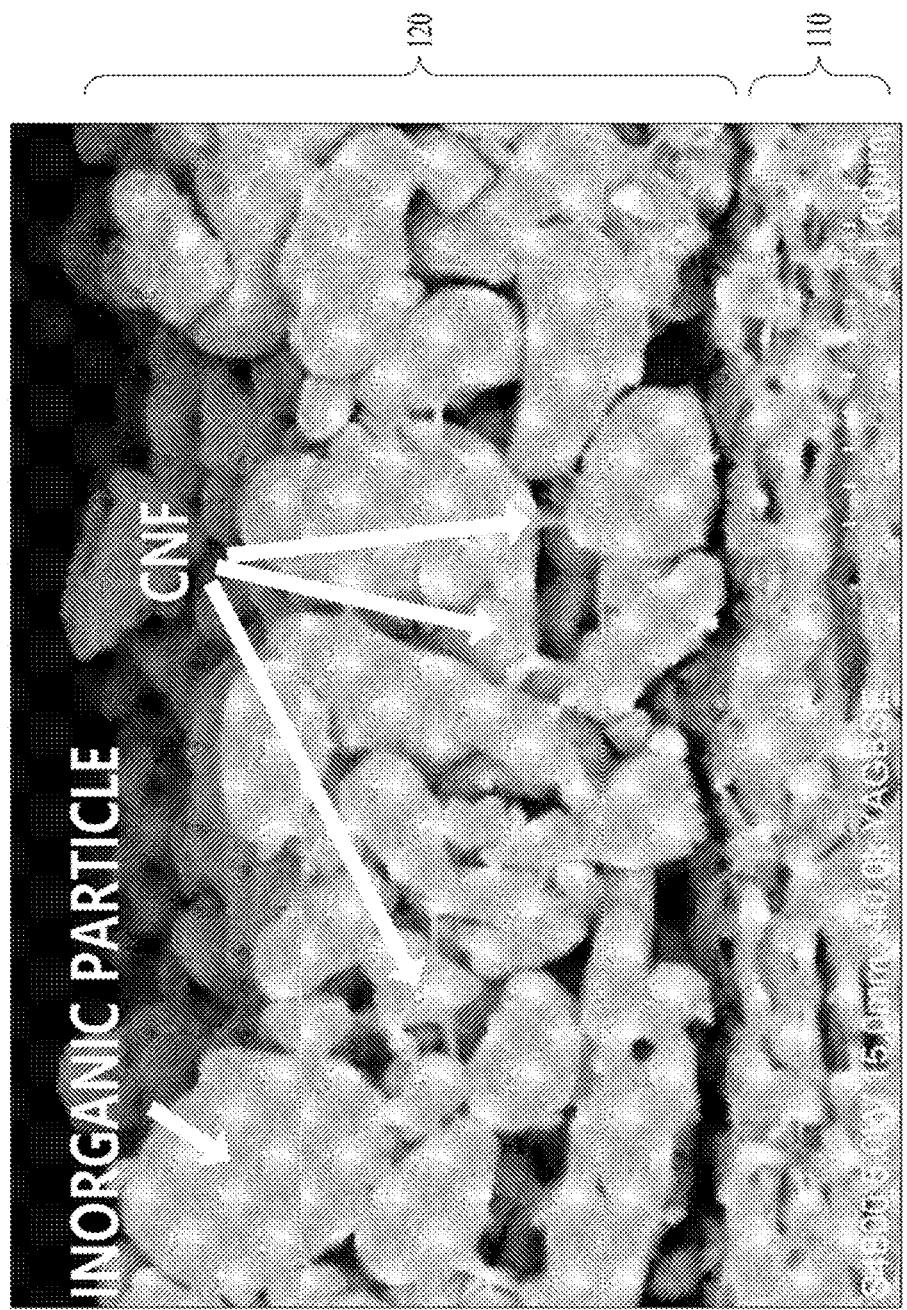
FIG. 3 is an SEM photograph showing a cross-section of a separator structure according to an embodiment of the present disclosure.

FIGS. 2 and 3 show SEM (Scanning Electron Microscopy) photographs in a case in which the cellulose nano fiber and the inorganic particles are coated on the support body 110.

As shown, the cellulose nano fiber 121 and the inorganic particles 122 together constitute the coating layer 120 to be positioned on the support body 110.

In particular, FIG. 2 shows a state in which the cellulose nano fiber 121 and the inorganic particles 122 form a network and is located on the support body 110.

In one example, a diameter of the cellulose nano fiber 121 may be in a range from 5 to 500 nm, and a length thereof may be in a range from 500 to 10 μm. This is not shown separately, but may be identified by AFM (Atomic Force Microscopy) analysis.

The diameter of 5 nm may correspond to a minimum diameter of the cellulose nano fiber 121. According to an embodiment of the present disclosure, a thickness of the coating layer 120 may be about 1.5 μm. Therefore, when the diameter exceeds 500 nm, it may be difficult to prepare the coating layer 120.

In addition, when the length of the cellulose nano fiber 121 is smaller than the above numerical range, the inorganic particles 122 may not be able to be connected to each other, so that the adhesion of the coating layer 120 may be reduced. Therefore, an effect of improving the heat resistance according to an embodiment of the present disclosure may be reduced. On the other hand, when the length of the cellulose nano fiber 121 is greater than the above numerical range, the uniformity of the coating layer 120 may be reduced.

Figure 4:
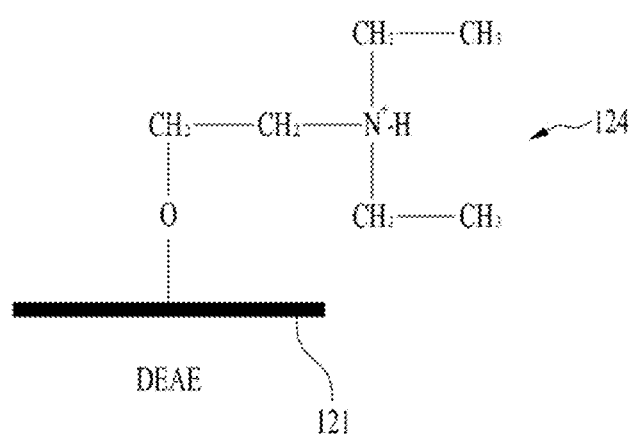
FIG. 4 is a schematic diagram showing an example of a cellulose nano fiber having a positive ion group of a separator structure according to an embodiment of the present disclosure.
Figure 5:
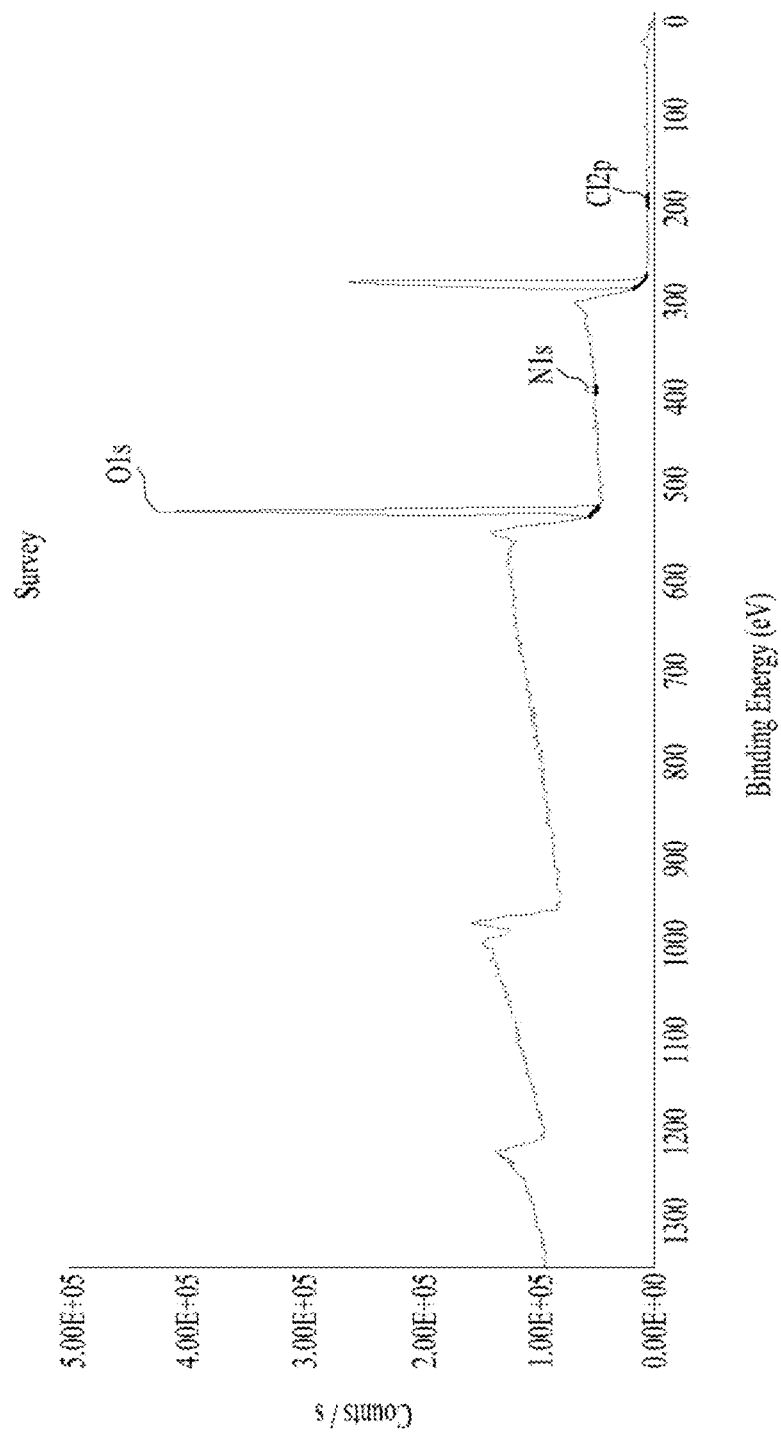
FIGS. 5 and 6 are XPS spectra of a cellulose nano fiber shown in FIG. 4.
Figure 6:
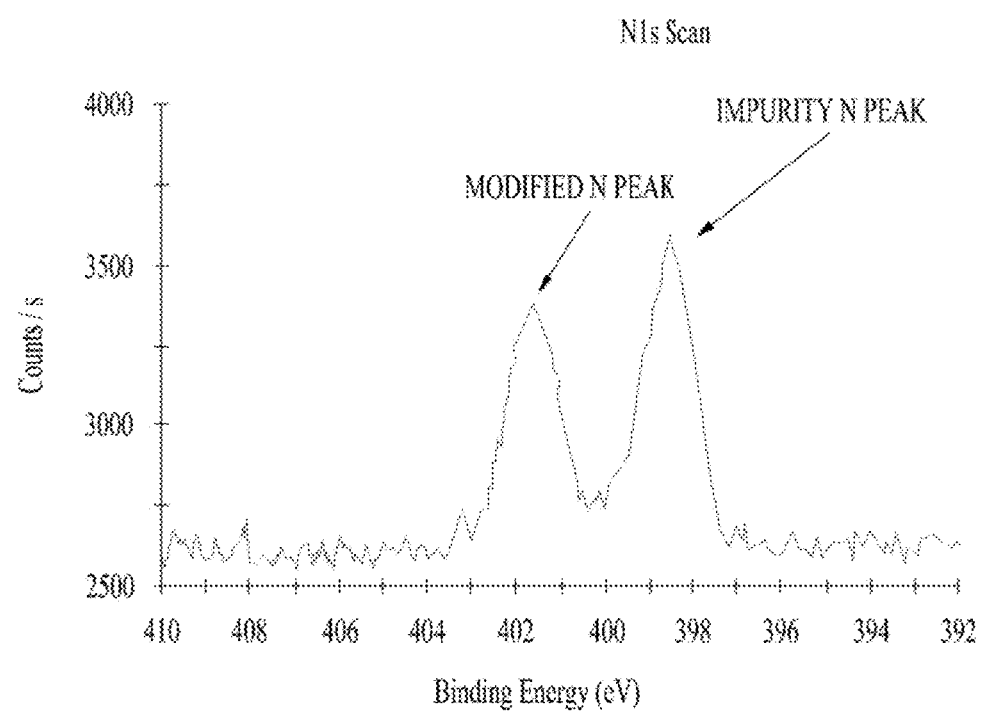

FIG. 4 is a schematic diagram showing an example of a cellulose nano fiber having a positive ion group of a separator structure according to an embodiment of the present disclosure. FIGS. 5 and 6 are XPS spectra of a cellulose nano fiber shown in FIG. 4.

Referring to FIG. 4, a cellulose nano fiber 121 having DEAE as an example of the positive ion group is schematically shown. That is, FIG. 4 shows a state in which the DEAE is substituted on the cellulose nano fiber 121, in other words, a state in which the DEAE is given as a cationic functional group 124 to the cellulose nano fiber 121.

The DEAE was analyzed using x-ray photoelectron spectroscopy (XPS) as shown in FIGS. 5 and 6. That is, a nitrogen (N) functional group in the DEAE structure other than C, H, and 0 of the cellulose nano fiber 121 was analyzed through the XPS analysis.

Referring to FIG. 5, it was seen that C, 0, N, Cl elements are present on the cation-exchanged cellulose nano fiber 121 as a result of a survey scan of analyzing a surface 10 nm depth using the XPS in order to identify the DEAE substituted on the cellulose nano fiber 121.

FIG. 6 shows a result of a narrow scan of the XPS. Referring to FIG. 6, 1.8 wt % of N was detected, and a degree of cation exchange on the cellulose nano fiber 121 is able to be identified through N peak area comparison.

In the case of cation-exchanged N (a modified N peak) on the cellulose nano fiber (121), it may be seen that binding energy is detected at a place higher than binding energy detected by a reaction reagent 2-(diethylamino)ethyl chloride hydrochloride) or impurities that did not participate in the reaction.

Figure 7:
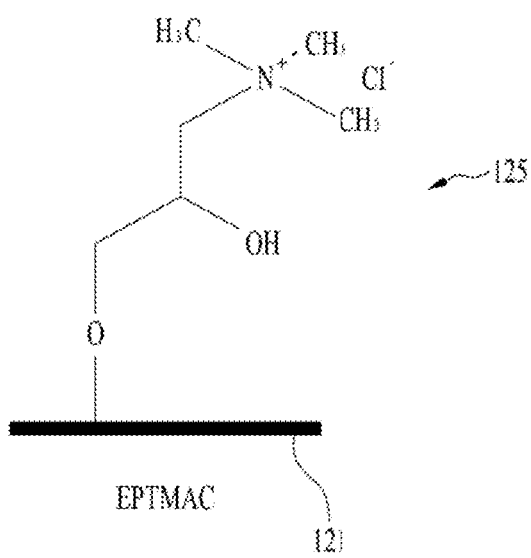
FIG. 7 is a schematic diagram showing another example of a cellulose nano fiber having a positive ion group of a separator structure according to an embodiment of the present disclosure.
Figure 8:
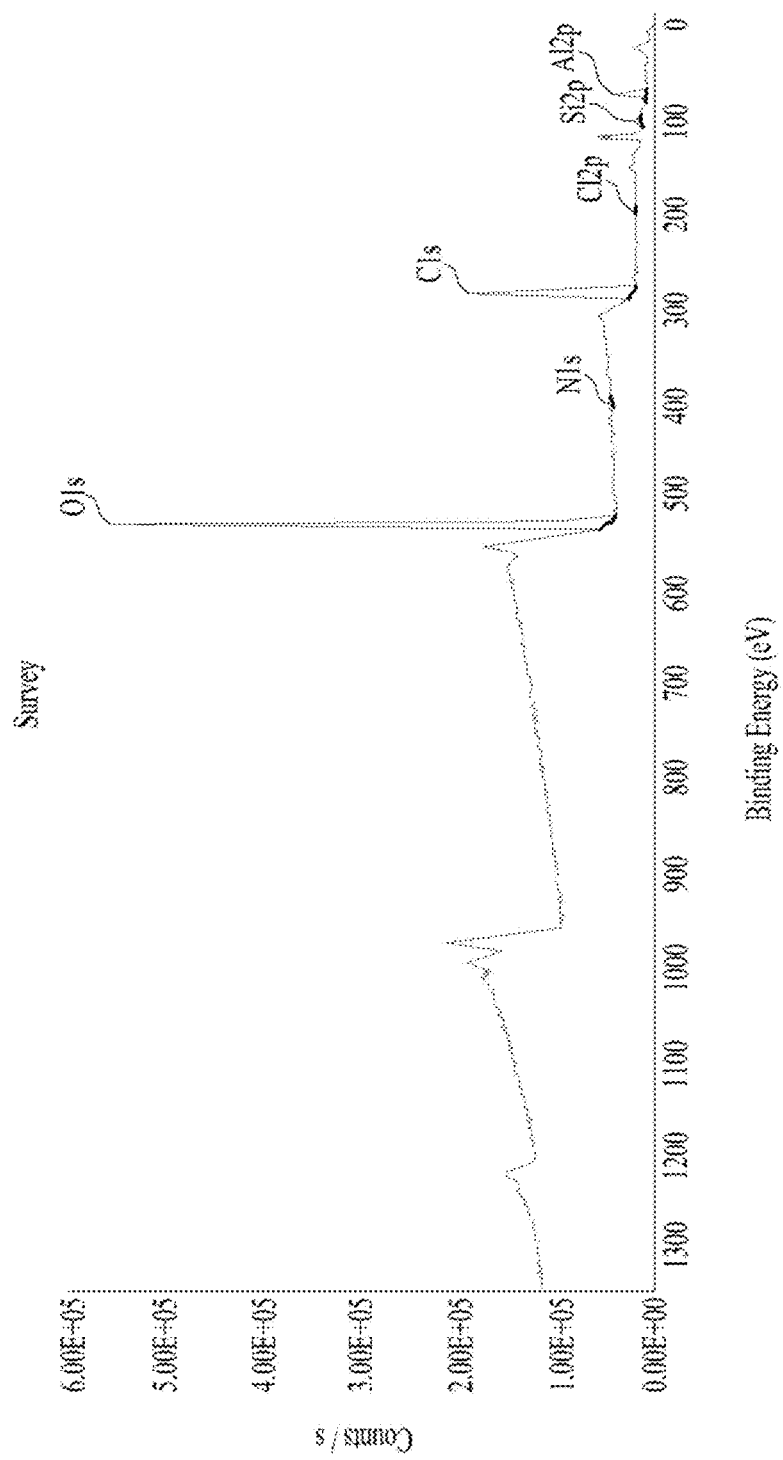
FIGS. 8 and 9 are XPS spectra of a cellulose nano fiber shown in FIG. 7.
Figure 9:
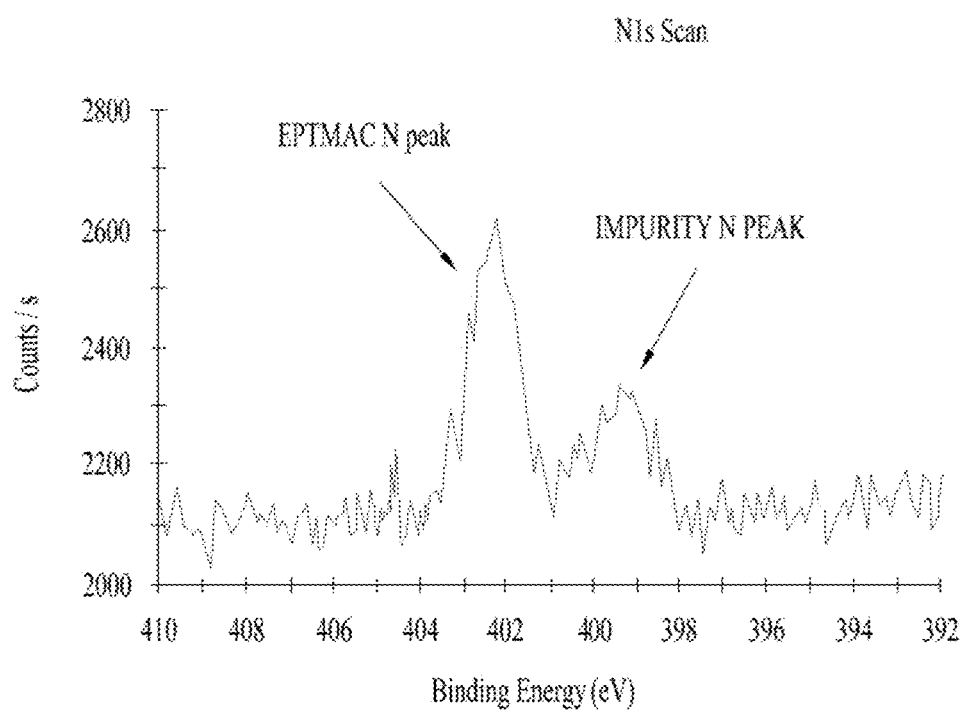

FIG. 7 is a schematic diagram showing another example of a cellulose nano fiber having a positive ion group of a separator structure according to an embodiment of the present disclosure. FIGS. 8 and 9 are XPS spectra of a cellulose nano fiber shown in FIG. 7.

Referring to FIG. 7, a cellulose nano fiber 121 having EPTMAC as an example of the positive ion group is schematically shown. That is, FIG. 7 shows a state in which the EPTMAC is partially substituted on the cellulose nano fiber 121, in other words, a state in which the EPTMAC is given as a cationic functional group 125 to the cellulose nano fiber 121.

The EPTMAC was analyzed using the x-ray photoelectron spectroscopy (XPS) as shown in FIGS. 8 and 9. That is, a nitrogen (N) functional group in the EPTMAC functional group of the cellulose nano fiber 121 was analyzed through the XPS analysis.

Referring to FIG. 8, it was seen that C, O, N, Cl, Al, and Si elements are present on the cation-exchanged cellulose nano fiber 121 as a result of a survey scan of analyzing a surface 10 nm depth using the XPS in order to identify the EPTMAC substituted on the cellulose nano fiber 121. In this connection, Al and Si are expected to be the impurities.

FIG. 9 shows a result of a narrow scan of the XPS. Referring to FIG. 9, 0.7 wt % of N was detected, and a degree of partial cation exchange on the cellulose nano fiber 121 is able to be identified through N peak area comparison.

In the case of the cation-exchanged N (the modified N peak) on the cellulose nano fiber 121, it may be seen that the binding energy is detected at a higher place than binding energy detected by a reaction reagent glycidyltrimethylammonium chloride (EPTMAC) or the impurities that did not participate in the reaction.

Figure 10:
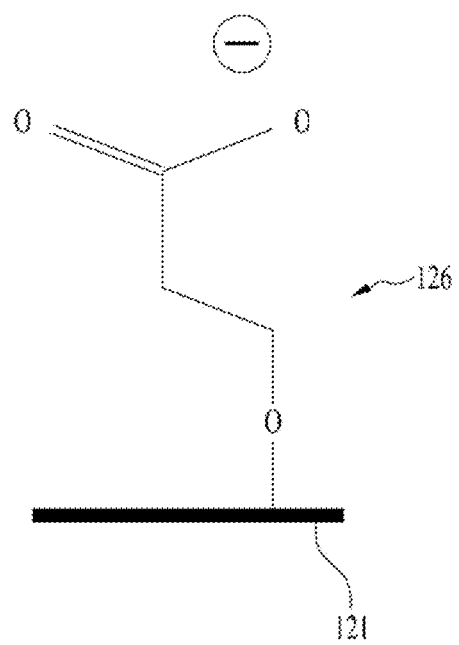
FIG. 10 is a schematic diagram showing another example of a cellulose nano fiber having a negative ion group of a separator structure according to an embodiment of the present disclosure.
Figure 11:
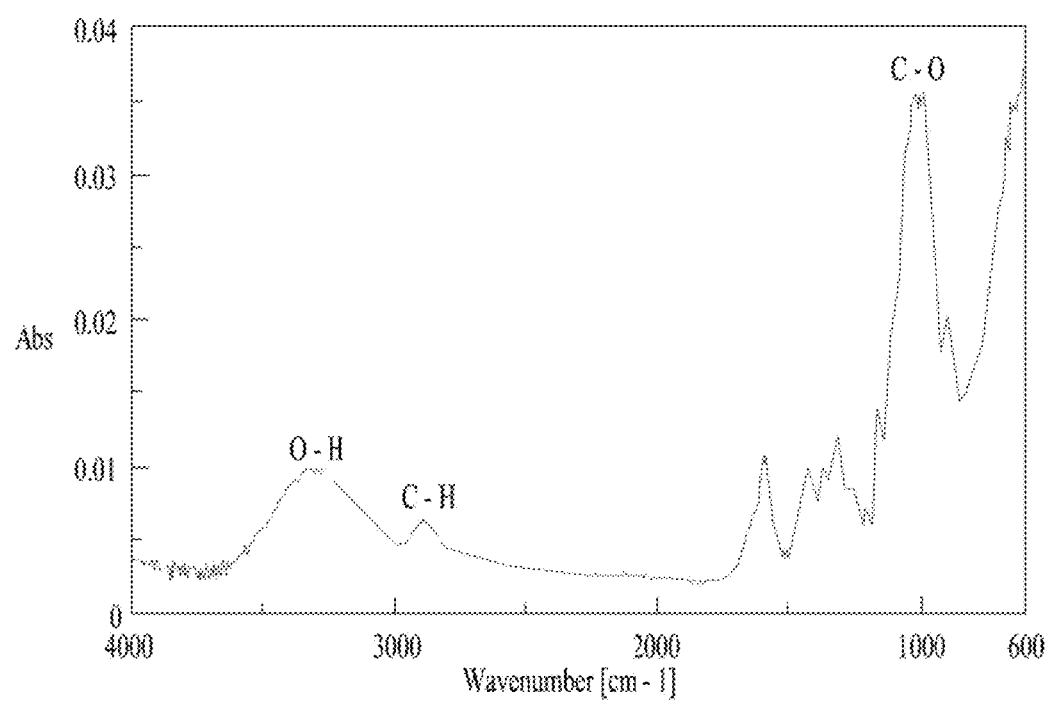
FIG. 11 is an FT-IR spectrum of a cellulose nano fiber shown in FIG. 10.

FIG. 10 is a schematic diagram showing another example of a cellulose nano fiber having a negative ion group of a separator structure according to an embodiment of the present disclosure. FIG. 11 is an FT-IR spectrum of a cellulose nano fiber shown in FIG. 10.

Referring to FIG. 10, a cellulose nano fiber 121 having carboxymethyl as an example of the negative ion group is schematically shown. That is, FIG. 10 shows a state in which the carboxymethyl is partially substituted on the cellulose nano fiber 121, in other words, a state in which the carboxymethyl is given to the cellulose nano fiber 121 as an anionic functional group 126.

Referring to FIG. 11, energy absorption based on vibration and rotation of a molecular skeleton present in a surface functional group may be measured using infrared irradiation (FT-IR). Using this, whether the cellulose nano fiber 121 has been subjected to surface treatment with the functional group given thereto may be identified. As shown, —OH, —CH, and —CO groups in a state in which the carboxymethyl is partially substituted on the cellulose nano fiber 121 were identified.

Figure 12:
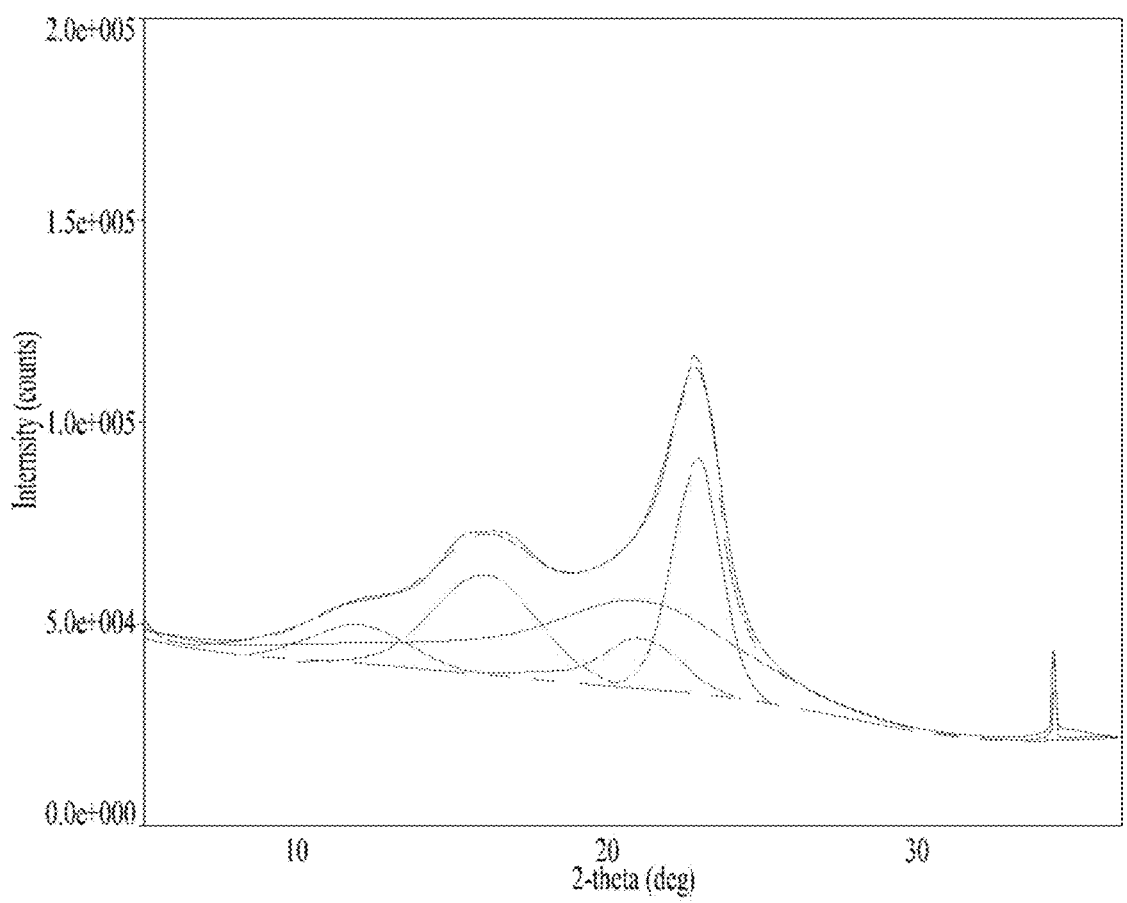
FIG. 12 is a schematic diagram showing an example of a cellulose nano fiber having a zwitterionic group of a separator structure according to an embodiment of the present disclosure.

FIG. 12 is a schematic diagram showing an example of a cellulose nano fiber having a zwitterionic group of a separator structure according to an embodiment of the present disclosure.

Referring to FIG. 12, a cellulose nano fiber 121 having the zwitterionic group may include both the positive ion group and the negative ion group described above. For example, the cellulose nano fiber 121 may include both the amine group and the carboxyl group.

That is, FIG. 12 shows a state in which the amine group and the carboxyl group are partially substituted on the cellulose nano fiber 121, in other words, a state in which the DEAE and the carboxymethyl are given as the zwitterionic group 127 to the cellulose nano fiber 121.

Figure 13:
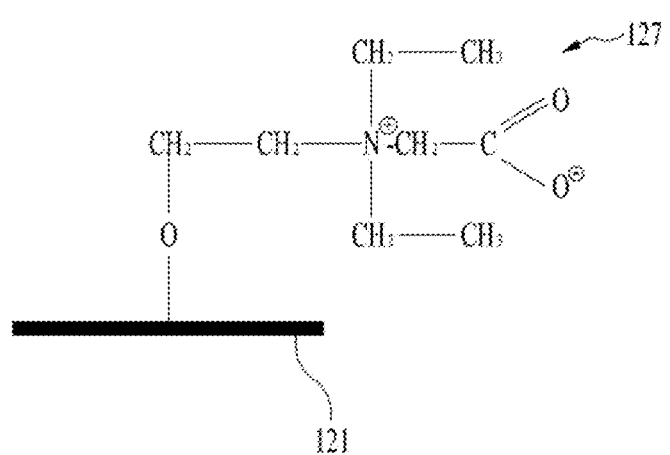
FIG. 13 is an XRD spectrum showing crystallinity of a cellulose nano fiber of a separator structure according to an embodiment of the present disclosure.

FIG. 13 is an XRD spectrum showing crystallinity of a cellulose nano fiber of a separator structure according to an embodiment of the present disclosure.

In order to secure the heat resistance of the cellulose nano fiber 121 or the coating layer 120 using the same, crystallinity control of the cellulose nano fiber 121 may be required. The crystallinity of the cellulose nano fiber 121 may be approximately in a range from 20 to 80%. That is, when the crystallinity of the cellulose nano fiber 121 is approximately in the range from 20 to 80%, the heat resistance of the coating layer 120 may be secured.

Specifically, it may be advantageous that the crystallinity of the cellulose nano fiber 121 is equal to or higher than 40%. In particular, the crystallinity of the cellulose nano fiber 121 may be in a range from 40 to 60%.

FIG. 13 shows the x-ray diffraction (XRD) spectrum, and as shown, a first crystalline cellulose nano fiber 121 exhibits peaks at 15°, 17°, 21°, 23°, and 34°, and a second crystalline cellulose nano fiber 121 exhibits peaks at 12°, 20°, and 22°.

Through such XRD spectrum analysis, it may be seen that the crystallinity of the cellulose nano fiber 121 is in the range from 40 to 60%. As such, the crystallinity of the cellulose nano fiber 121 according to an embodiment of the present disclosure may be controlled to be in the range from 40 to 60%. However, as described above, the crystallinity may be controlled to be in a larger range, for example in a range from 20 to 80%.

Figure 14:
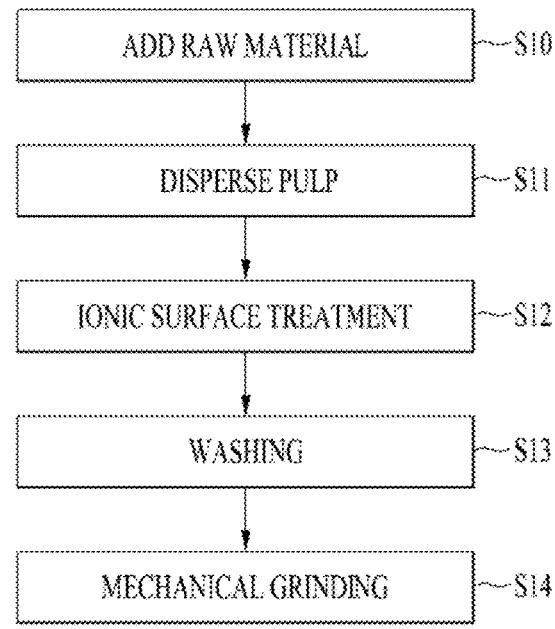
FIG. 14 is a flowchart showing a preparation process of a cellulose nanofiber that has been subjected to ionic surface treatment of a separator structure according to an embodiment of the present disclosure.

FIG. 14 is a flowchart showing a preparation process of a cellulose nanofiber that has been subjected to ionic surface treatment of a separator structure according to an embodiment of the present disclosure.

FIG. 14 shows a preparation process of the cellulose nano fiber 121 that has been subjected to the ionic surface treatment, which may be commonly applicable to the present disclosure.

In order to prepare the cellulose nano fiber 121 that has been subjected to the ionic surface treatment, first, a raw material may be added (step S10). This process may be a process of adding pulp into a solvent, for example, water, and stirring the solvent. Bamboo, needleleaf tree, and hardwood pulp may be used as the raw material for the pulp. For example, the hardwood pulp may be used.

Next, the pulp may be dispersed (step S11). In this connection, a surface area of the pulp may be improved such that the pulp may react with ions using defibration, beating, or a mixer.

Thereafter, ionic surface treatment may be performed on the pulp (step S12). A specific process of such ionic surface treatment may differ depending on anions, cations, and zwitterions. This will be described later by way of example in detail.

Next, the pulp on which the ionic surface treatment has been performed may be washed (step S13). To this end, distilled water at a room temperature may be added, and stirred with the pulp to evenly dilute the pulp. Then the washing of the pulp may be performed using a strainer. This process may proceed until pH of the solution becomes neutral.

Thereafter, a mechanical grinding process may be performed (step S14). For the mechanical grinding of the pulp that has been subjected to the ionic surface treatment, aqueous counter collision, a high-speed defibrating machine, a grinder, a high pressure homogenizer, a high pressure impingement mill, a ball mill, a bead mill, a disk type refiner, a conical refiner, a twin-screw kneader, a vibration mill, a homomixer under a under high speed rotation, an ultrasonic disperser, a beater, and the like may be used.

Hereinafter, each ion treatment process will be described in detail by way of example. In this connection, a description of a duplicated portion may be omitted. That is, the portion described with reference to FIG. 14 may be equally applied to a portion that is not specifically described.

Figure 15:
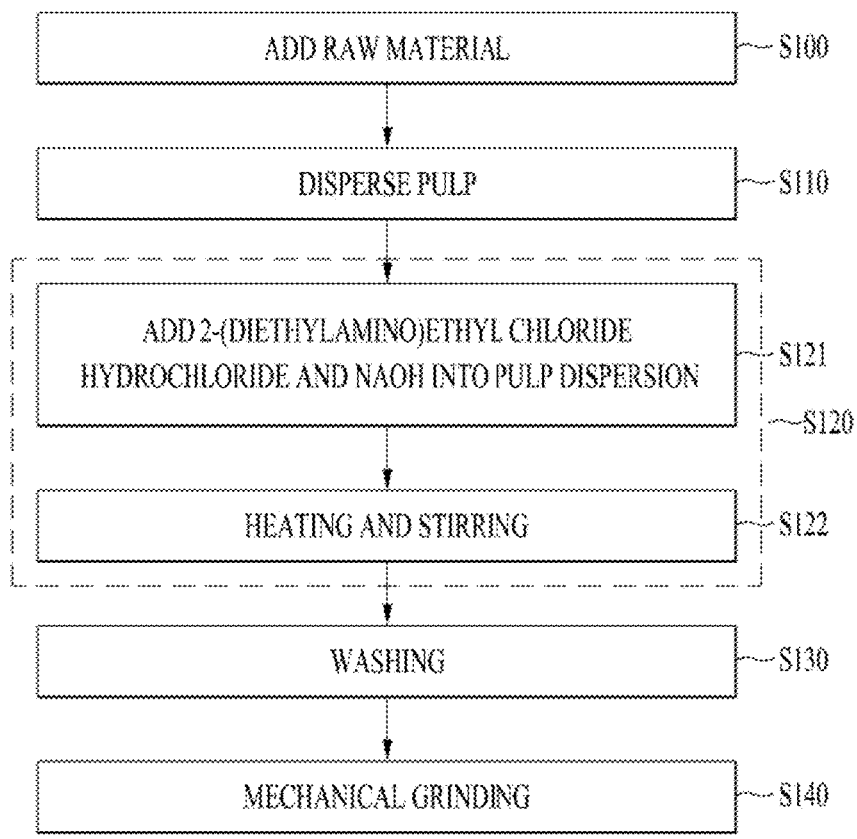
FIG. 15 is a flowchart showing a preparation process of a cation-treated cellulose nano fiber of a separator structure according to an embodiment of the present disclosure.

FIG. 15 is a flowchart showing a preparation process of a cation-treated cellulose nano fiber of a separator structure according to an embodiment of the present disclosure.

In this connection, as an example of the cationic surface treatment, a process of preparing the cation-treated cellulose nanofiber 121 using the DEAE will be described.

To this end, first, a raw material may be added (step S100).

Thereafter, the pulp may be dispersed (step S110). In this connection, it may be advantageous that a pulp dispersion concentration is in a range from 0.2 to 15 wt %.

Thereafter, the cationic surface treatment may be performed on the pulp (step S120). To this end, first, 2-(diethylamino)ethyl chloride hydrochloride and sodium hydroxide (NaOH) may be added into the pulp dispersion (S121).

In this connection, a mixing ratio of 2-(diethylamino) ethyl chloride hydrochloride in the pulp dispersion may be in a range from a 1:1 weight ratio (wt %) to a 1:20 weight ratio. It may be advantageous that the mixing ratio of the pulp and NaOH is in a range from a 1:1 weight ratio to a 1:15 weight ratio.

Next, such pulp dispersion may be heated and stirred (step S122).

Thereafter, the pulp on which the cationic surface treatment has been performed may be washed (step S130).

Next, a mechanical grinding process may be performed (step S140).

Figure 16:
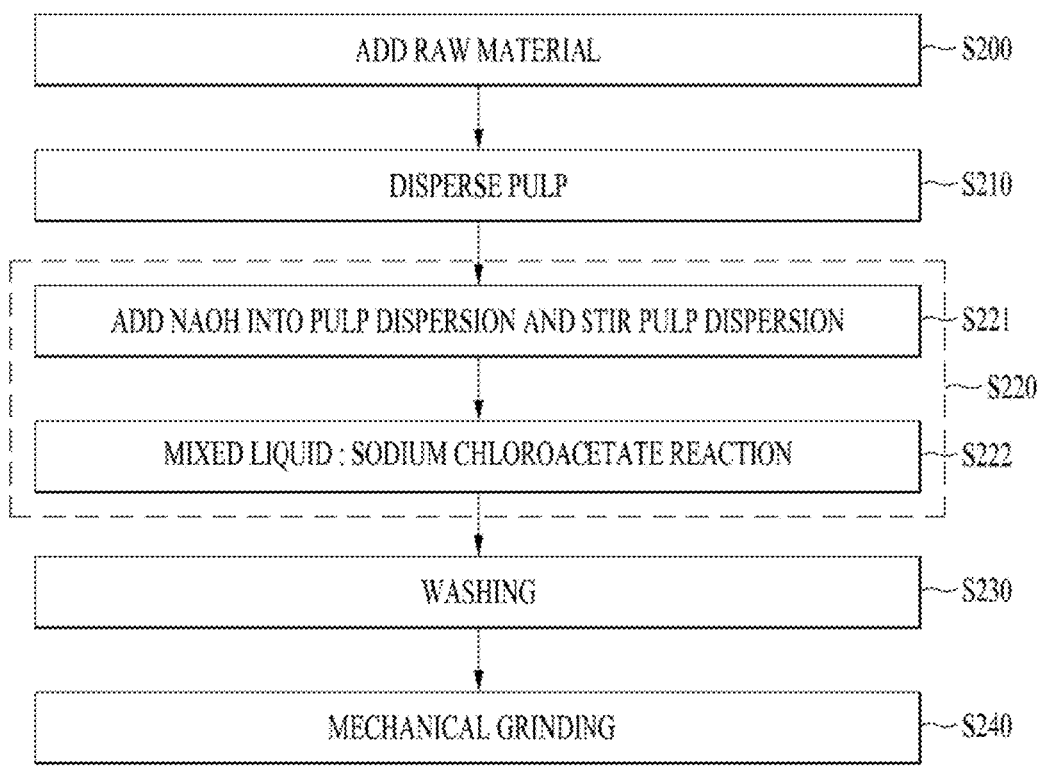
FIG. 16 is a flowchart showing a preparation process of an anion-treated cellulose nano fiber of a separator structure according to an embodiment of the present disclosure.

FIG. 16 is a flowchart showing a preparation process of an anion-treated cellulose nano fiber of a separator structure according to an embodiment of the present disclosure.

In this connection, as an example of the anionic surface treatment, a process of preparing the anion surface-treated cellulose nano fiber 121 using carboxymethyl will be described.

To this end, first, a raw material may be added (step S200).

Thereafter, the pulp may be dispersed (step S210). In this connection, it may be advantageous that the pulp dispersion concentration is in a range from 0.2 to 15 wt %.

Thereafter, the anionic surface treatment may be performed on the pulp (step S220). To this end, first, sodium hydroxide (NaOH) may be added into the pulp dispersion (step S221).

In this connection, a mixing ratio of the pulp and NaOH may be in a range from 0.1 weight ratio (wt %) to 0.5 weight ratio.

Next, such pulp dispersion may be reacted with sodium chloroacetate (step S222).

It may be advantageous that a mixing ratio of the pulp and the sodium chloroacetate is in a range from 0.1 to 0.7 wt %.

Thereafter, the pulp on which the cationic surface treatment has been performed may be washed (step S230).

Next, a mechanical grinding process may be performed (step S240).

Figure 17:
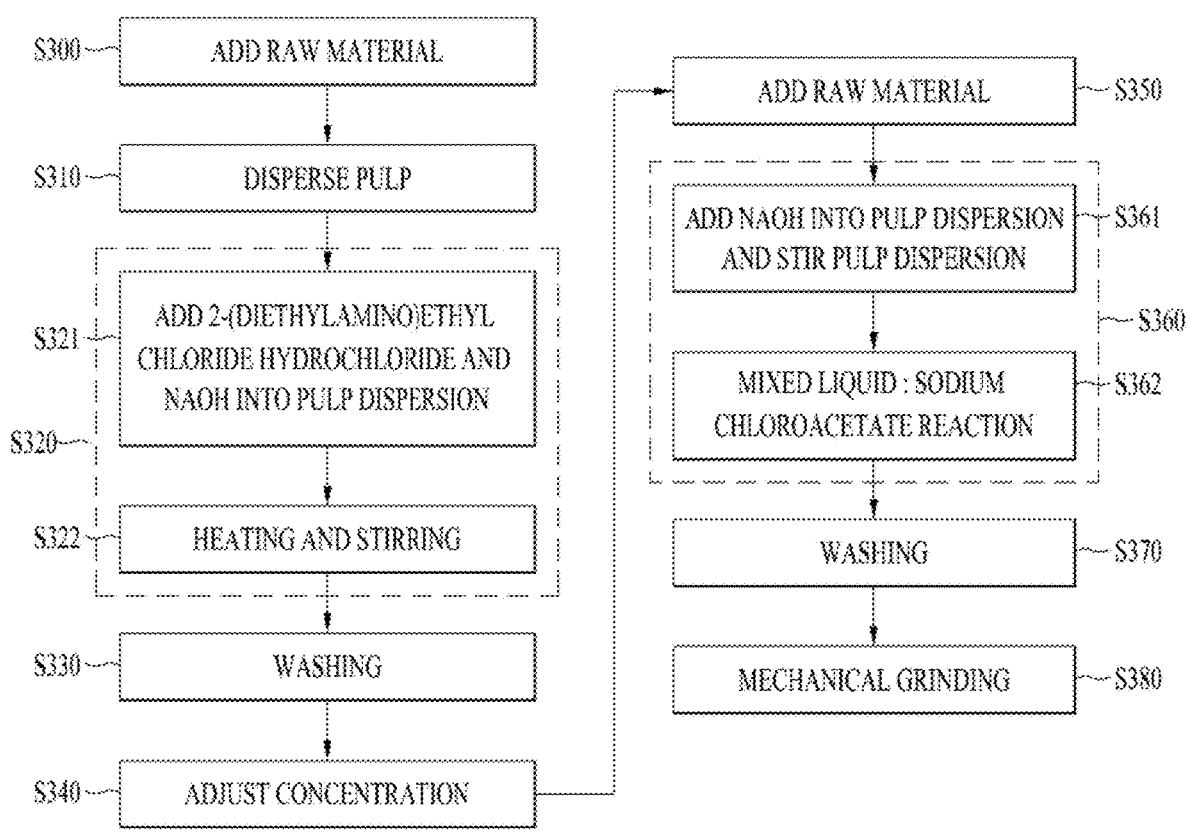
FIG. 17 is a flowchart showing a preparation process of a cellulose nano fiber treated with a zwitterion of a separator structure according to an embodiment of the present disclosure.

FIG. 17 is a flowchart showing a preparation process of a cellulose nano fiber treated with a zwitterion of a separator structure according to an embodiment of the present disclosure.

In this connection, in the zwitterion surface treatment, the cationic surface treatment and the anionic surface treatment described above may be sequentially performed.

As an example of the cationic surface treatment, the cationic surface treatment may be performed using the DEAE, and then, as an example of the anionic surface treatment, the anionic surface treatment may be performed using the carboxymethyl by adjusting the concentration.

Hereinafter, a preparation process of the cellulose nano fiber 121 surface-treated with the zwitterion will be briefly described.

In this connection, steps S300 to S330 may be the same as the cationic surface treatment process described above, that is, steps S100 to S130. Thereafter, steps S350 to S380 may be the same as the anionic surface treatment process described above, that is, steps S200 to S240.

Between the cationic surface treatment process (steps S300 to S330) and the anionic surface treatment process (steps S350 to S380), a process (step S340) of adjusting the concentration may be performed. Such process of adjusting the concentration (step S340) may include a process of introducing or removing an appropriate solvent. Hereinafter, a duplicated description will be omitted.

Figure 18:
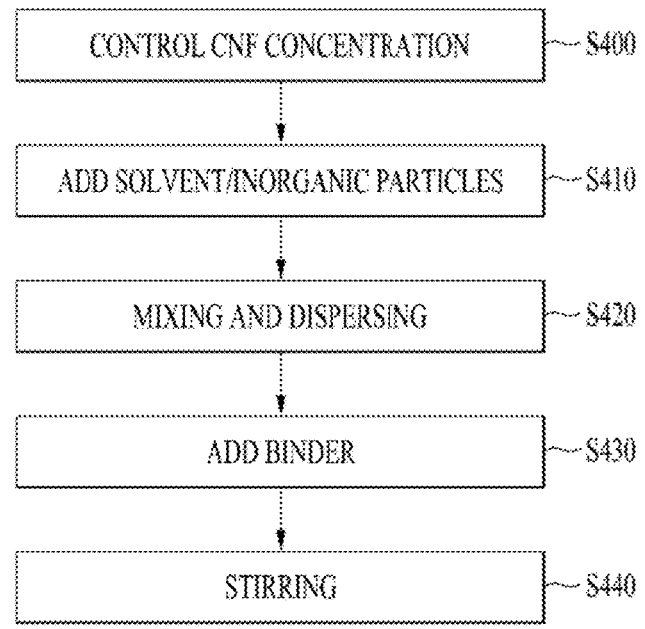
FIG. 18 is a flowchart showing a preparation process of a coating solution composite of a separator structure according to an embodiment of the present disclosure.

FIG. 18 is a flowchart showing a preparation process of a coating solution composite of a separator structure according to an embodiment of the present disclosure.

As described above, the structure of the separator 100 according to an embodiment of the present disclosure may include the coating layer 120 containing the cellulose nano fiber 121 that has been subjected to the ionic surface treatment on at least one face of the support body 110.

In this connection, the coating layer 120 containing the cellulose nano fiber 121 that has been subjected to the ionic surface treatment may be formed through coating with a coating solution on at least one face of the support body 110.

That is, as an embodiment, the structure of the separator 100 according to an embodiment of the present disclosure may be formed through a step of obtaining the coating solution composite and a step of coating the coating solution composite on the support body 110.

Such a coating solution composite may contain 0.1 to 2 wt % of the nano cellulose to which the ionic functional group is given, the inorganic particles having the permittivity constant equal to or higher than 5, and the binder.

Hereinafter, a process of preparing the coating solution composite containing the cellulose nano fiber 121 that has been subjected to the ionic surface treatment will be described.

First, the concentration may be adjusted by adding or removing a dispersion solvent to or from the cellulose nano fiber (CNF) 121 (step S400).

For example, when water is used as the dispersion solvent, that is, when the cellulose nanofibers (CNF) 121 is prepared with a water-based dispersion mixture, the concentration may be controlled by adding water or through a dehydration process using microwave equipment. In this connection, the concentration of the cellulose nano fiber 121 may be in a range from 0.1 to 2 wt % relative to the dispersion solvent.

Thereafter, a solvent may be added to the water-based dispersion mixture of the cellulose nano fiber 121 (step S410). In this connection, the solvent may be composed of an organic solvent and deionized water mixed with each other or the organic solvent alone.

When using the organic solvent, acetone, ethanol, IPA, and the like having a boiling point equal to or lower than 100° C. may be used. In this connection, it may be advantageous that a content of the organic solvent added may be in a range from 10 to 80% relative to the deionized water in the case of the water-based coating solution. In one example, when the organic solvent is used alone, the content of the organic solvent added may be in a range from 90 to 100%.

In this connection, the inorganic particles 122 may be further added to the dispersion into which the solvent is added (step S410). The inorganic particles may include at least one of $Al_2O_3$, $BaTiO_3$, $SiO_2$, $TiO_2$, and $SnO_2$, and inorganic powder having a permittivity constant equal to or higher than 5 may be additionally used.

A particle size of the inorganic particle 122 may be in a range from 50 nm to 1 μm based on D50. In addition, a particle shape of the inorganic particles 122 may be spherical, planar, acicular, hexahedral, polyhedral, amorphous, and the like.

Next, a mixing and dispersing process (step S420) may be performed. A ball-milling process may be performed to uniformly mix the dispersion (slurry) with the inorganic particles 122 and crush the inorganic particles 122.

Thereafter, the binder 123 may be added (step S430). The binder 123 may bind the cellulose nano fiber 121 with the inorganic particles 122, or increase adhesion of the coating solution to the support body 110.

Acrylic, PVA, PVP, PVO, SBR/CMC, and the like-based binders may be used as a binder for water-based coating solution. A content of the binder for such water-based coating solution may be in a range from 0.5 to 30%.

As an oil-based coating solution binder, PVDF and the like-based binders may be used. A content of such oil-based coating solution binder may be in a range from 5 to 50%.

Thereafter, the mixed solution may be stirred to prepare the coating solution composite (step S440).

After the binder is added in the previous step (step S430), the coating solution composite (slurry) for coating the support body 110 may be prepared by uniformly mixing the mixed solution with the binder by planetary mixing.

The separator 100 may be prepared by coating such a coating solution composite on the support body 110. When the coating solution is dried, a dry coating layer 120 may be formed. Such dry coating layer 120 may contain 1 to 10 wt % of the cellulose nano fiber 121 to which the ionic functional group is given.

In other words, the dry coating composite may contain 1 to 10 wt % of the cellulose nano fiber 121 to which the ionic functional group is given, the inorganic particles having the permittivity constant equal to or higher than 5, and the binder.

Figure 19:
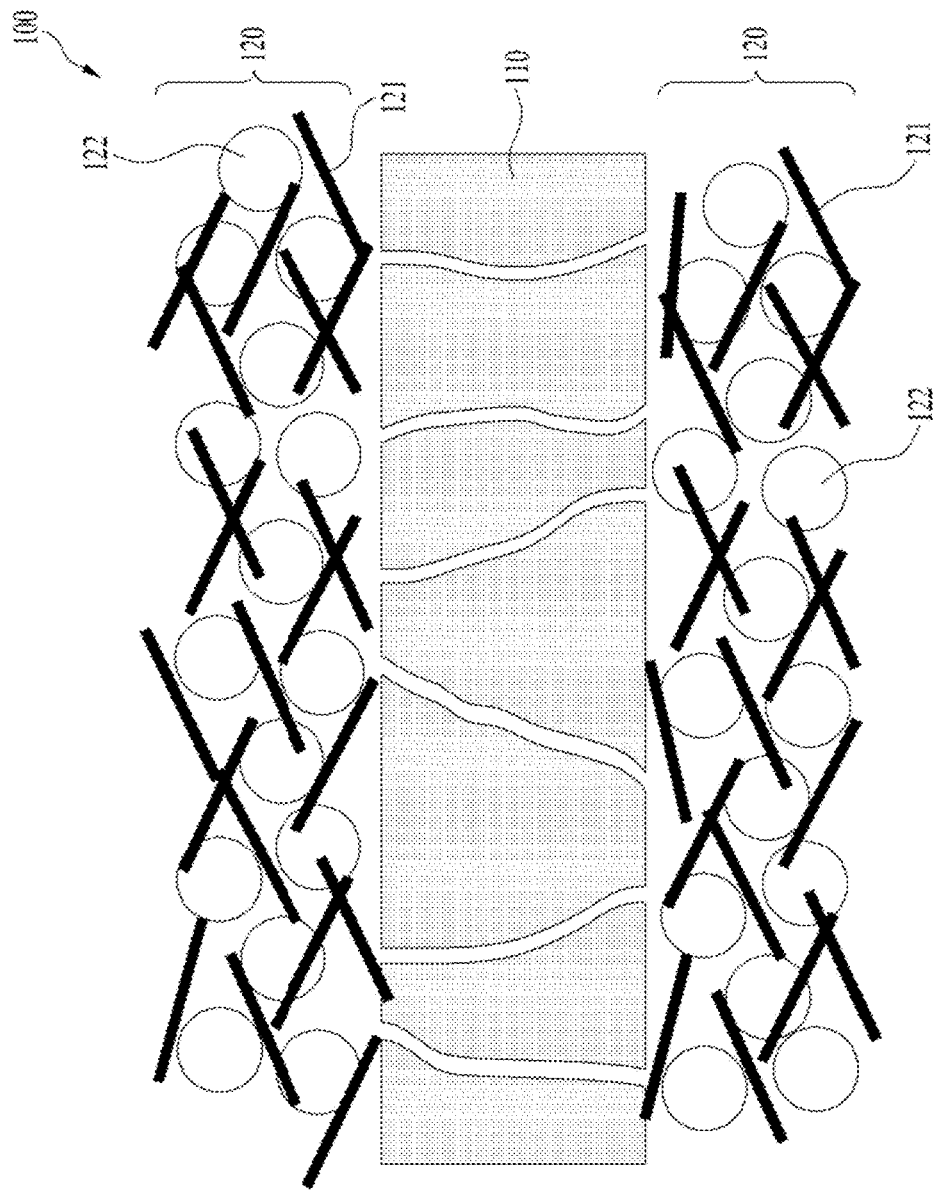
FIG. 19 is a schematic cross-sectional view showing a separator structure according to a first embodiment of the present disclosure.
Figure 20:
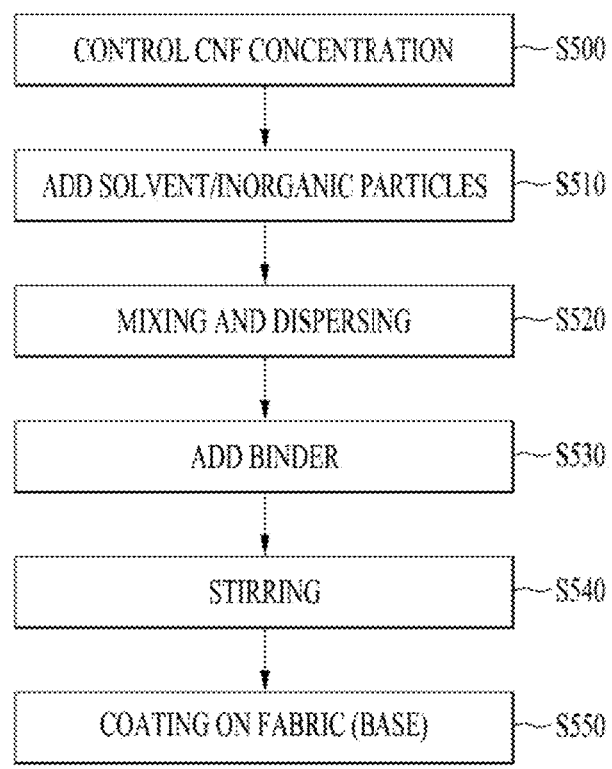
FIG. 20 is a flowchart showing a process of preparing a separator structure according to a first embodiment of the present disclosure.

FIG. 19 is a schematic cross-sectional view showing a separator structure according to a first embodiment of the present disclosure. FIG. 20 is a flowchart showing a process of preparing a separator structure according to a first embodiment of the present disclosure.

FIG. 19 shows a structure of the separator 100 in which the coating layers 120 containing the cellulose nano fiber 121 to which the ionic functional group is given and the inorganic particles 122 are respectively coated on the both faces of the support body 110.

In this connection, the support body 110 may be a porous base (fabric) having the plurality of holes 113 extending from one face to the opposite face or may include such a porous base (fabric).

Specifically, such support body 110 may be a porous film in which one type of polyolefin (such as PE, PP, and the like)-based polymer resin exists or different types of polyolefin-based polymer resin are mixed with each other.

The cellulose nano fiber (CNF) 121 and the inorganic particles 122 may constitute the coating layer 120.

In addition, the cellulose nanofiber (CNF) 121 that has been subjected to the ionic surface treatment may be used for such structure of the separator 100. Such cellulose nanofiber 121 that has been subjected to the ionic surface treatment may be the cellulose nano fiber 121 to which the ionic functional group is given.

Such structure of the separator 100 shown in FIG. 19 may be substantially the same as the structure of the separator 100 shown in FIG. 1. FIG. 1 shows the state in which the coating layer 120 is located only on the first face 111 of the support body 110, but other than that, FIG. 1 may be substantially the same as the embodiment of FIG. 19. That is, the coating layer 120 shown in FIG. 19 may also contain the binder 123 in addition to the cellulose nano fiber 121 and the inorganic particles 122. In other words, the illustration of the binder 123 is omitted in FIG. 19.

Referring to FIG. 19, the cellulose nano fiber 121 and the inorganic particles 122 form the network structure. In addition, the matters described with reference to FIG. 1 may be equally applied to the present embodiment. Therefore, a duplicated description will be omitted.

Hereinafter, a process of preparing the structure of the separator 100 shown in FIG. 19 will be described with reference to FIG. 20. The process of preparing the structure of the separator 100 may be substantially the same as the process of coating the coating solution composite on the support body 110 described above.

First, the concentration may be adjusted by adding or removing the dispersion solvent to or from the cellulose nano fiber (CNF) 121 (step S500).

Thereafter, the solvent may be added into the water-based dispersion mixture of the cellulose nano fiber 121 (step S510).

In this connection, the inorganic particle 122 may be further added into the dispersion into which the solvent is added (step S510). The inorganic particles may include at least one of $Al_2O_3$, $BaTiO_3$, $SiO_2$, $TiO_2$, and $SnO_2$. In addition, the inorganic powders with the permittivity constant equal to or higher than 5 may be used.

Next, the mixing and dispersing process (step S520) may be performed. The ball-milling process may be performed to uniformly mix the dispersion (slurry) with the inorganic particles 122 and crush the inorganic particles 122.

Thereafter, the binder 123 may be added (step S530). The binder 123 may bind the cellulose nano fiber 121 with the inorganic particles 122, or increase the adhesion of the coating solution to the support body 110.

Next, the mixture solution may be stirred to prepare the coating solution composite (step S540).

Thereafter, such coating solution composite may be coated on the support body 110 (the fabric or the base) to prepare the separator 100.

In this connection, a porous polyolefin-based fabric (base) may be used as the support body 110 (the fabric or the base).

As a scheme for coating the coating solution composite on such support body 110, dip coating, bar coating, die coating, comma coating, gravure coating, or a mixture scheme thereof may be used to coat the coating solution composite on at least one face, that is, one face or both faces of the support body 110.

Figure 21:
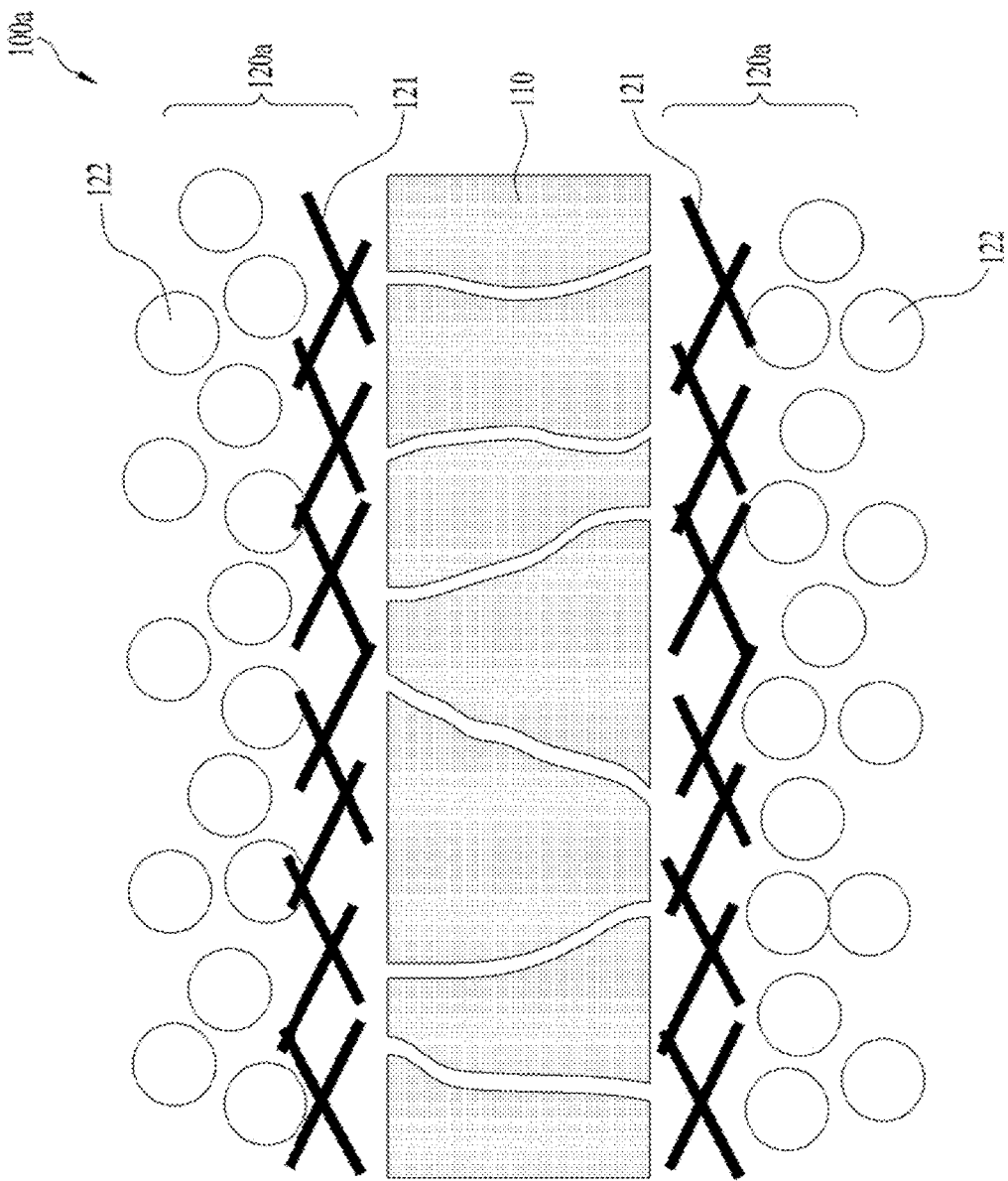
FIG. 21 is a schematic cross-sectional view showing a separator structure according to a second embodiment of the present disclosure.
Figure 22:
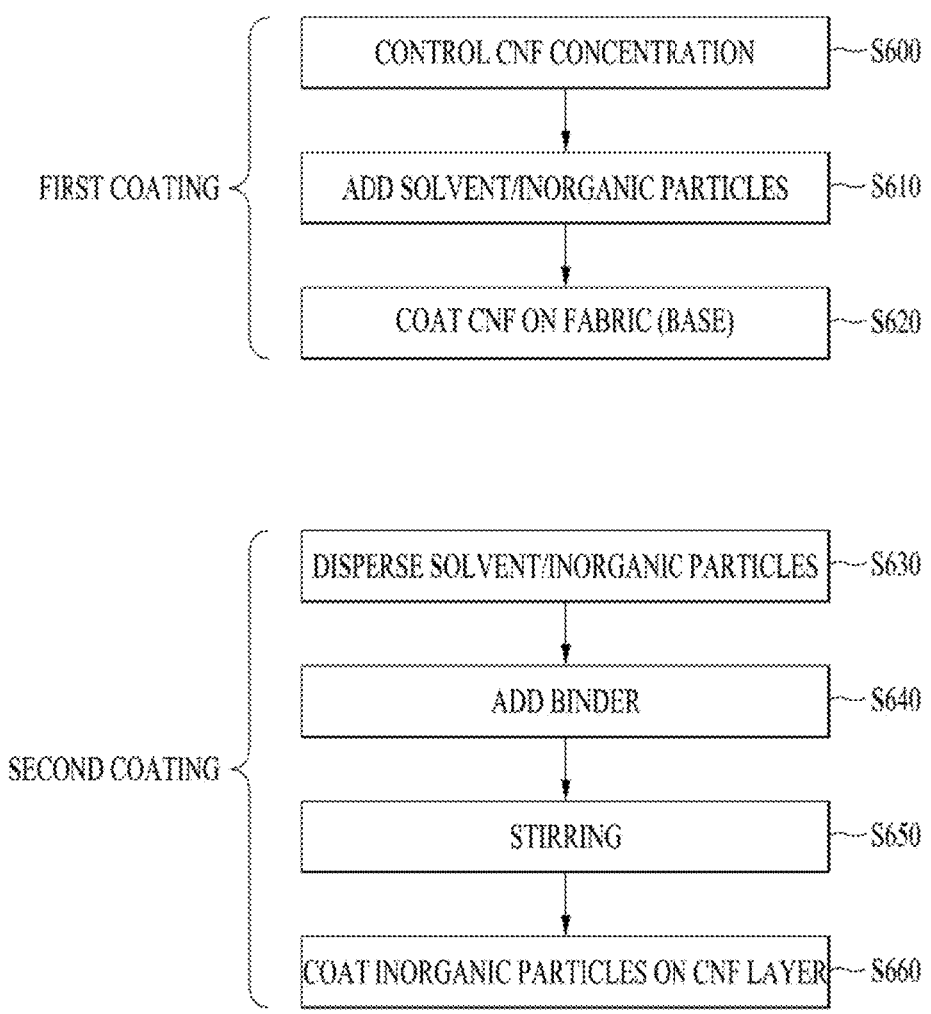
FIG. 22 is a flowchart showing a process of preparing a separator structure according to a second embodiment of the present disclosure.

FIG. 21 is a schematic cross-sectional view showing a separator structure according to a second embodiment of the present disclosure. FIG. 22 is a flowchart showing a process of preparing a separator structure according to a second embodiment of the present disclosure.

FIG. 21 shows a structure of a separator 100a in which coating layers 120a containing the cellulose nano fiber 121 to which the ionic functional group is given and the inorganic particles 122 are respectively coated on the both faces of the support body 110.

As shown in FIG. 21, the coating layer 120a may include a layer of the cellulose nano fiber 121 located closer to the support body 110, and a layer of the inorganic particles 122 located on the layer of the cellulose nano fiber 121.

That is, the structure of the separator 100a according to the second embodiment may contain the layer of the cellulose nano fiber 121 and the layer of the inorganic particles 122 that are positioned to be distinguished from each other. In one example, such cellulose nano fiber 121 and inorganic particles 122 have very small sizes, so that the cellulose nano fiber 121 and the inorganic particles 122 may be located in a mixed state in at least a portion of the coating layer 120a.

Such structure of the separator 100a according to the second embodiment may be formed through two coating processes. In other words, the coating process may include a first coating process of coating the layer of cellulose nano fiber 121 on the support body 110, and a second coating process of coating the layer of the inorganic particles 122 on the layer of the cellulose nano fiber 121.

Hereinafter, a process of preparing the structure of the separator 100a shown in FIG. 21 will be described with reference to FIG. 22.

First, the concentration may be adjusted by adding or removing the dispersion solvent to or from the cellulose nano fiber (CNF) 121 (step S600).

For example, when the water is used as the dispersion solvent, that is, when the cellulose nanofibers (CNF) 121 is prepared with the water-based dispersion mixture, the concentration may be controlled by adding the water or through the dehydration process using the microwave equipment. In this connection, the concentration of the cellulose nano fiber 121 may be in the range from 0.1 to 2 wt % relative to the dispersion solvent.

Thereafter, the organic solvent may be added into the water-based dispersion mixture of the cellulose nano fiber 121 (step S610). In this connection, the solvent may be composed of the organic solvent and the deionized water mixed with each other or the organic solvent alone.

As the organic solvent, the acetone, the ethanol, the IPA, and the like having the boiling point equal to or lower than 100° C. may be used. In this connection, it may be advantageous that the content of the organic solvent added may be in the range from 10 to 80% relative to the deionized water in the case of the water-based coating solution.

Thereafter, the first coating process may be performed by coating the dispersion of the cellulose nano fiber 121 to which the organic solvent is added to the support body 110 (the fabric or the base) (step S620).

As the scheme for coating the coating solution composite on such support body 110, the dip coating, the bar coating, the die coating, the comma coating, the gravure coating, or the mixture scheme thereof may be used to coat the coating solution composite on at least one face, that is, one face or both faces of the support body 110.

Next, the second coating may be performed.

First, the inorganic particles 122 may be added and dispersed in the solvent (step S630). In this connection, the solvent may be composed of the organic solvent and the deionized water mixed with each other or the organic solvent alone.

As the organic solvent, the acetone, the ethanol, the IPA, and the like having the boiling point equal to or lower than 100° C. may be used. In this connection, it may be advantageous that the content of the organic solvent added may be in the range from 10 to 80% relative to the deionized water in the case of the water-based coating solution.

The inorganic particles may include at least one of Al2O3, BaTiO3, SiO2, TiO2, and SnO2. In addition, the inorganic powders with the permittivity constant equal to or higher than 5 may be used.

The particle size of the inorganic particle 122 may be in the range from 50 nm to 1 μm based on D50. In addition, the particle shape of the inorganic particles 122 may be spherical, planar, acicular, hexahedral, polyhedral, amorphous, and the like. The ball-milling process may be performed to uniformly mix the dispersion (slurry) with the inorganic particles 122 and crush the inorganic particles 122.

Thereafter, the binder 123 may be added (step S640). As the binder for the water-based coating solution, the acrylic, PVA, PVP, PVO, SBR/CMC, and the like-based binders may be used. A content of such binder for the water-based coating solution may be in a range from 0.5 to 30 wt %.

The oil-based coating solution binder may use the PVDF and the like-based binder. The content of such oil-based coating solution binder may be in the range from 5 to 50%.

Thereafter, the mixture may be stirred to prepare the coating solution composite containing the inorganic particles 122 (step S650).

Thereafter, such coating solution composite may be coated on the layer of the cellulose nano fiber (CNF) 121 to prepare the separator 100 (step S660).

As a scheme for coating such coating solution composite, the dip coating, the bar coating, the die coating, the comma coating, the gravure coating, or the mixture scheme thereof may be used.

Figure 23:
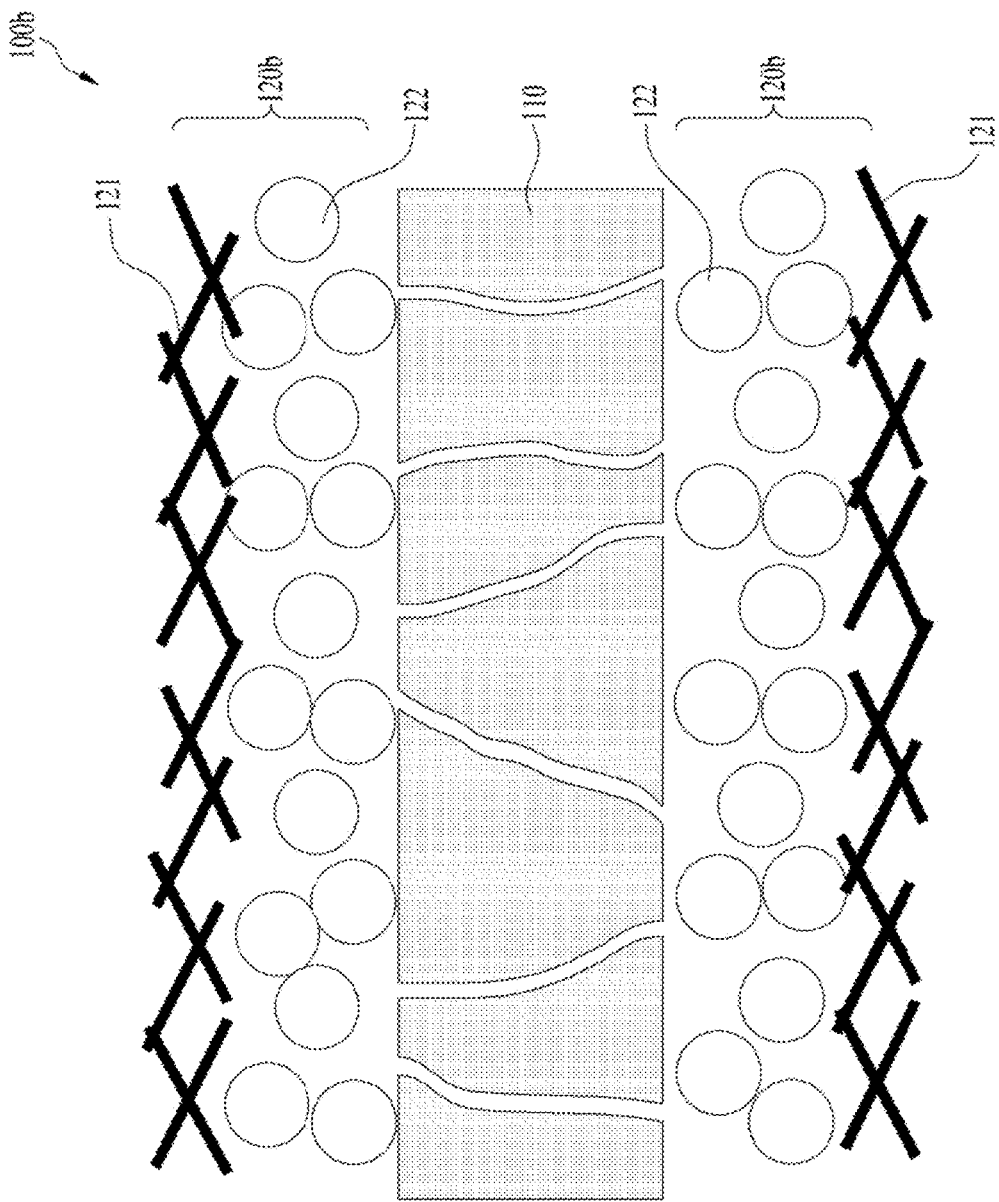
FIG. 23 is a schematic cross-sectional view showing a separator structure according to a third embodiment of the present disclosure.
Figure 24:
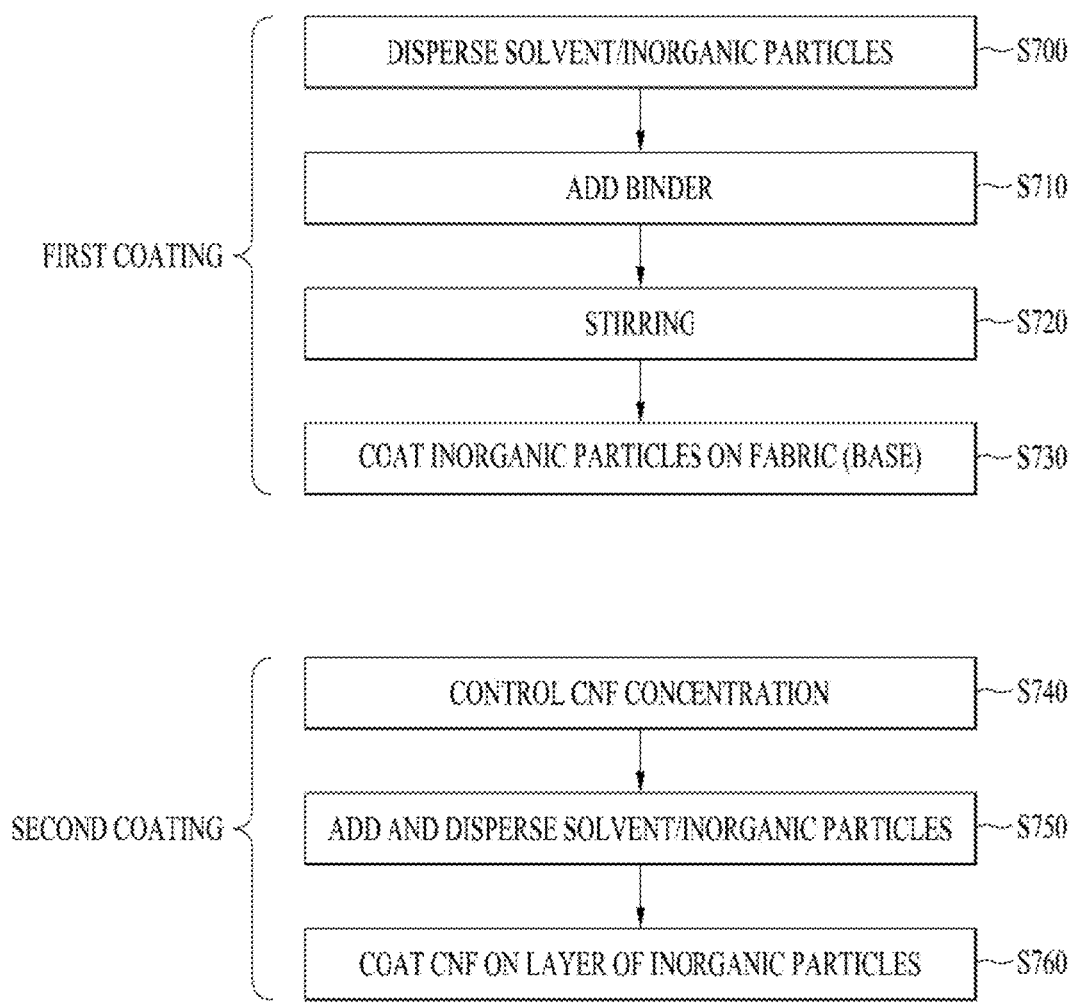
FIG. 24 is a flowchart showing a process of preparing a separator structure according to a third embodiment of the present disclosure.

FIG. 23 is a schematic cross-sectional view showing a separator structure according to a third embodiment of the present disclosure. FIG. 24 is a flowchart showing a process of preparing a separator structure according to a third embodiment of the present disclosure.

FIG. 23 shows a structure of a separator 100b in which coating layers 120b containing the cellulose nano fiber 121 to which the ionic functional group is given and the inorganic particles 122 are respectively coated on the both faces of the support body 110.

As shown in FIG. 23, the coating layer 120b may include a layer of the inorganic particles 122 located closer to the support body 110, and a layer of the cellulose nano fiber 121 located on the layer of the inorganic particles 122.

That is, the structure of the separator 100a according to the third embodiment may include the layer of the cellulose nano fiber 121 and the layer of the inorganic particles 122 that are positioned to be distinguished from each other. In one example, such cellulose nano fiber 121 and inorganic particles 122 have very small sizes, so that the cellulose nano fiber 121 and the inorganic particles 122 may be located in a mixed state in at least a portion of the coating layer 120b.

Such structure of the separator 100b according to the third embodiment may be formed through two coating processes. In other words, the coating process may include a first coating process of coating the layer of the inorganic particles 122 on the support body 110, and a second coating process of coating the layer of the cellulose nano fiber 121 on the layer of the inorganic particles 122.

Hereinafter, a process of preparing the structure of the separator 100b shown in FIG. 23 will be described with reference to FIG. 24. Such preparation process may be substantially the same as a process in which an order of the first coating and the second coating described with reference to FIG. 22 is different. Therefore, a duplicated description will be simply made or omitted.

First, the inorganic particles 122 may be added and dispersed in the solvent (step S700). In this connection, the solvent may be composed of the organic solvent and the deionized water mixed with each other or the organic solvent alone.

As the organic solvent, the acetone, the ethanol, the IPA, and the like having the boiling point equal to or lower than 100° C. may be used. In this connection, it may be advantageous that the content of the organic solvent added may be in the range from 10 to 80% relative to the deionized water in the case of the water-based coating solution.

The inorganic particles may include at least one of $Al_2O_3$, $BaTiO_3$, $SiO_2$, $TiO_2$, and $SnO_2$. In addition, the inorganic powders with the permittivity constant equal to or higher than 5 may be used.

Thereafter, the binder 123 may be added (step S710). As the binder for the water-based coating solution, the acrylic, PVA, PVP, PVO, SBR/CMC, and the like-based binders may be used. The content of such binder for the water-based coating solution may be in the range from 0.5 to 30 wt %.

As the oil-based coating solution binder, the PVDF and the like-based may be used. The content of such oil-based coating solution binder may be in the range from 5 to 50%.

Thereafter, the mixture may be stirred to prepare the coating solution composite containing the inorganic particles 122 (step S720).

Next, the first coating process may be performed by coating such coating solution composite on the support body 110 (the fabric or the base) (step S730).

As a scheme for coating the coating solution composite on such support body 110, dip coating, bar coating, die coating, comma coating, gravure coating, or a mixture scheme thereof may be used to coat the coating solution composite on at least one face, that is, one face or both faces of the support body 110.

Next, the second coating may be performed.

First, the concentration may be adjusted by adding or removing the dispersion solvent to or from the cellulose nano fiber (CNF) 121 (step S740).

For example, when the water is used as the dispersion solvent, that is, when the cellulose nanofibers (CNF) 121 is prepared with the water-based dispersion mixture, the concentration may be controlled by adding the water or through the dehydration process using the microwave equipment. In this connection, the concentration of the cellulose nano fiber 121 may be in the range from 0.1 to 2 wt % relative to the dispersion solvent.

Thereafter, the organic solvent may be added into the water-based dispersion mixture of the cellulose nano fiber 121 and dispersed (step S750). In this connection, the solvent may be composed of the organic solvent and the deionized water mixed with each other or the organic solvent alone.

As the organic solvent, the acetone, the ethanol, the IPA, and the like having the boiling point equal to or lower than 100° C. may be used. In this connection, it may be advantageous that the content of the organic solvent added may be in the range from 10 to 80% relative to the deionized water in the case of the water-based coating solution.

Thereafter, the second coating process may be performed by coating the dispersion of the cellulose nano fiber 121 into which the organic solvent is added on the first coating layer (the layer of the organic particles 122) (step S760).

As a scheme for coating the dispersion of the cellulose nano fiber 121 on the layer of the inorganic particles 122, the dip coating, the bar coating, the die coating, the comma coating, the gravure coating, or the mixture scheme thereof may be used.

Figure 25:
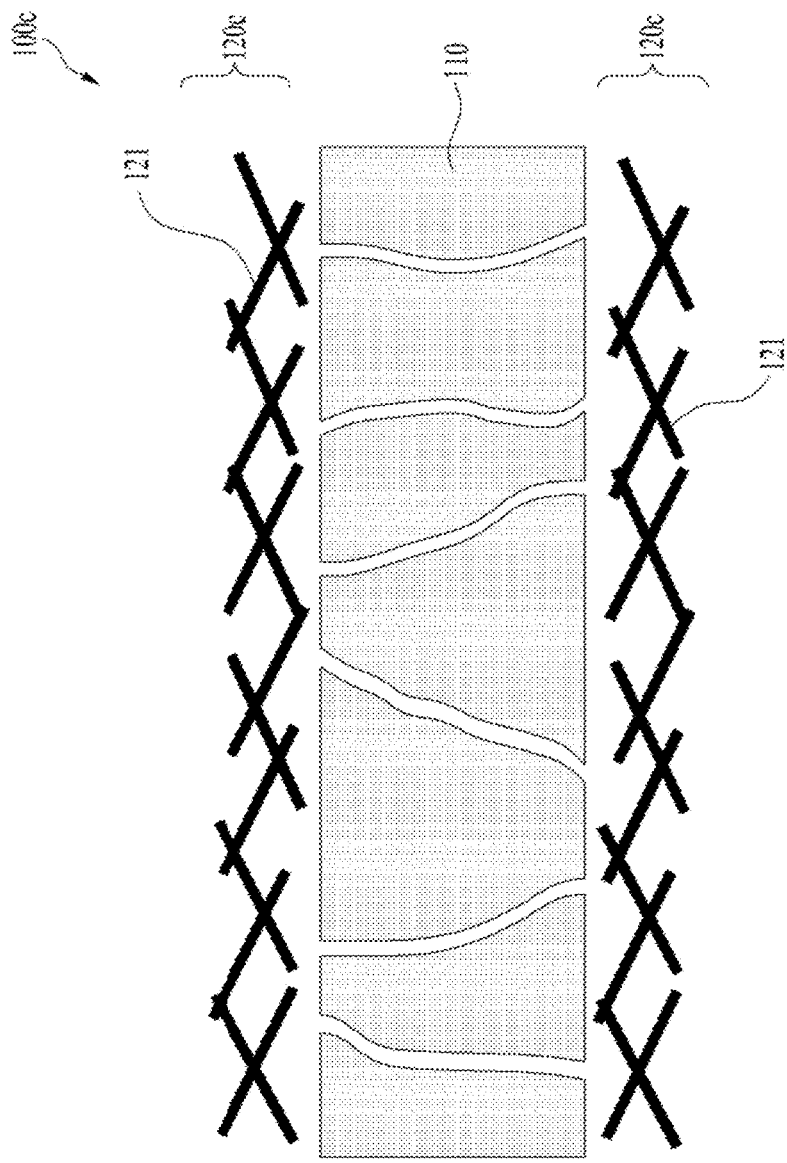
FIG. 25 is a schematic cross-sectional view showing a separator structure according to a fourth embodiment of the present disclosure.
Figure 26:
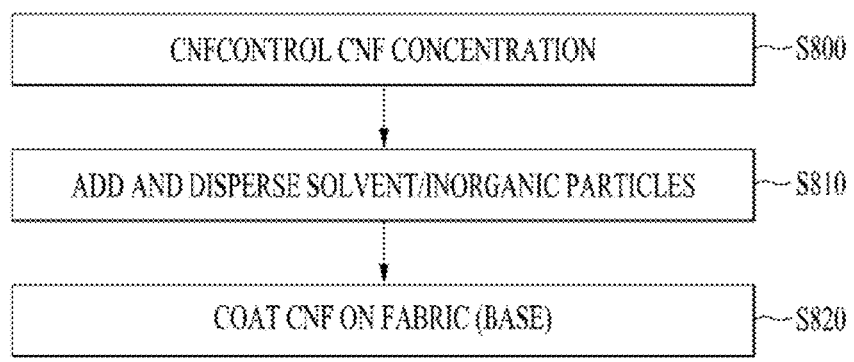
FIG. 26 is a flowchart showing a process of preparing a separator structure according to a fourth embodiment of the present disclosure.

FIG. 25 is a schematic cross-sectional view showing a separator structure according to a fourth embodiment of the present disclosure. FIG. 26 is a flowchart showing a process of preparing a separator structure according to a fourth embodiment of the present disclosure.

FIG. 25 shows a structure of a separator 100c in which coating layers 120c containing the cellulose nano fiber 121 to which the ionic functional group is given are respectively coated on both faces of the support body 110.

As shown in FIG. 25, the coating layer 120c may include a layer of the cellulose nano fiber 121. The present embodiment shows an embodiment in which the coating layer 120c does not contain the inorganic particles 122.

As such, high temperature durability may be secured even with the coating layer 120c that does not contain the inorganic particles 122 but contains the cellulose nano fiber 121.

A content of such coating layer 120c not containing the inorganic particles 122 but containing the cellulose nano fiber 121 may be in a range from 80 to 100 wt %.

Thus, a large amount of cellulose nano fiber 121 may be used, so that an effect resulted from characteristics of the cellulose nano fiber 121 may be increased.

Hereinafter, a process of preparing the separator structure according to the fourth embodiment of the present disclosure will be described with reference to FIG. 26.

First, the concentration may be adjusted by adding or removing the dispersion solvent to or from the cellulose nano fiber (CNF) 121 (step S800).

For example, when the water is used as the dispersion solvent, that is, when the cellulose nanofibers (CNF) 121 is prepared with the water-based dispersion mixture, the concentration may be controlled by adding the water or through the dehydration process using the microwave equipment.

Thereafter, the organic solvent may be added into the water-based dispersion mixture of the cellulose nano fiber 121 and dispersed (step S810). In this connection, the solvent may be composed of the organic solvent and the deionized water mixed with each other or the organic solvent alone.

As the organic solvent, the acetone, the ethanol, the IPA, and the like having the boiling point equal to or lower than 100° C. may be used. In this connection, it may be advantageous that the content of the organic solvent added may be in the range from 10 to 80% relative to the deionized water in the case of the water-based coating solution.

Thereafter, the coating process may be performed by coating the dispersion of the cellulose nano fiber 121 to which the organic solvent is added on the support body 110 (the fabric or the base) (step S820).

As a scheme for coating the coating solution composite on such support body 110, dip coating, bar coating, die coating, comma coating, gravure coating, or a mixture scheme thereof may be used to coat the coating solution composite on at least one face, that is, one face or both faces of the support body 110.

During the coating process, the solvent may be dried. Therefore, the dry coating composite may contain 80 to 100 wt % of the cellulose nano fiber 121.

As described above, an organic-inorganic composite separator having excellent heat resistance and mechanical strength may be prepared simply by preparing the coating solution composite (the water-based or oil-based coating solution) mixed with the polymer binder 123 to strengthen the adhesion of the ion-treated cellulose nano fiber 121, and coating the coating solution composite on one face or both faces of the polyolefin-based support body 110 and drying the coating solution composite.

As described above, in the coating step of the cellulose nano fiber 121, the inorganic particles 122 may be added and coated for additional performance improvement. In this connection, a film of a random network structure of the cellulose nano fiber 121 on a fiber may connect the inorganic particles 122 with each other to prevent the inorganic particles 122 from being eliminated. Thus, performances such as thermal contraction characteristics, mechanical strength, and the like may be ameliorated.

As described above, each of the embodiments has been described, but the structure of the separator 100 may be implemented in a form in which the embodiments are combined with each other depending on a purpose of use. For example, a form in which the structures of the first and second embodiments are combined with each other, a form in which the structures of the first and third embodiments are combined with each other, a form in which the structures of the second and third embodiments are combined with each other, and a form in which the structures of the first to third embodiments are combined with each other may also be possible.

In addition, the cellulose nano fiber 121 and the inorganic particles 122 may be coupled to each other in various forms in addition to the above-described embodiments to constitute the separator structure.

In addition, in all the embodiments described above, because the polyolefin-based fabric may be used as the base of the support body 110, a closing function (shut down), which is one of main performances of the secondary battery separator, may also be maintained. In this connection, the closing function refers to a function of blocking a risk of battery explosion or the like resulted from closing of the porous structure of the support body 110 when the temperature exceeds a limit temperature. At the same time, the high temperature durability may be improved by the application of the cellulose nano fiber 121 to which the ionic functional group is given, thereby maximizing battery use safety.

Figure 27:
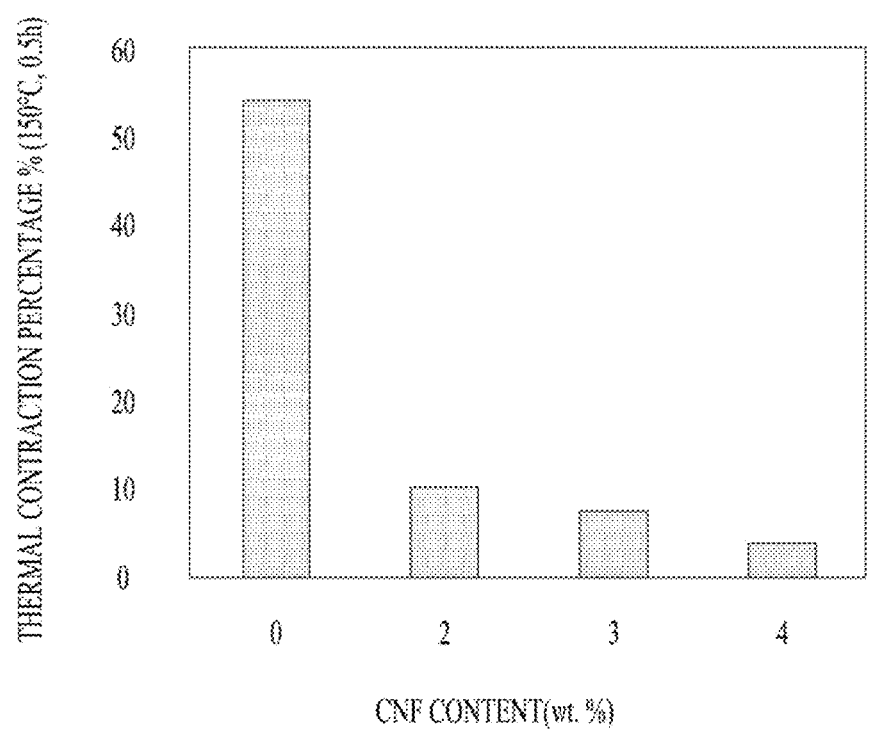
FIG. 27 is a graph showing a thermal contraction percentage of a separator structure according to an embodiment of the present disclosure.
Figure 28:
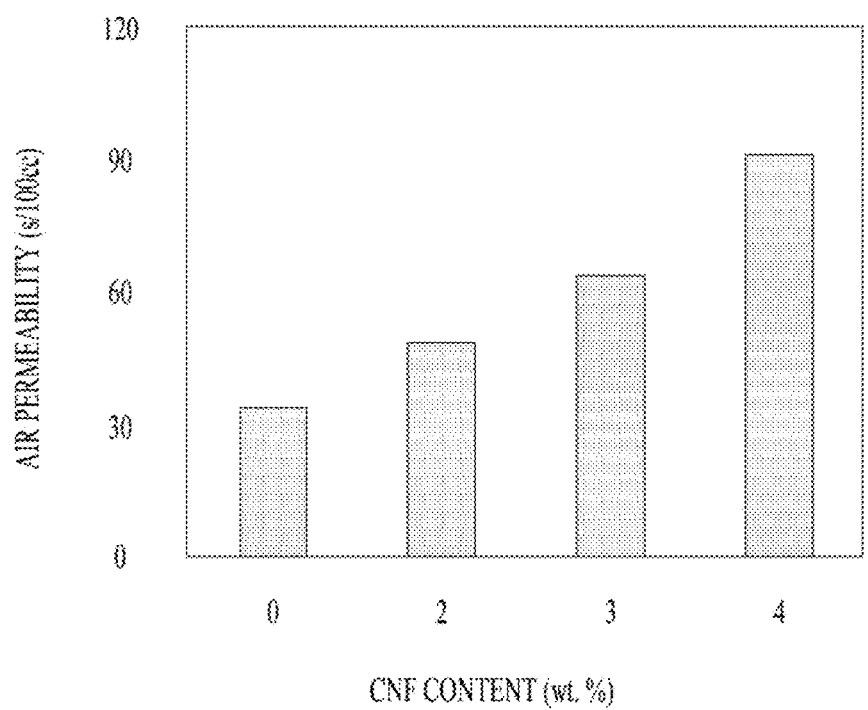
FIG. 28 is a graph showing air permeability of a separator structure according to an embodiment of the present disclosure.

FIG. 27 is a graph showing a thermal contraction percentage of a separator structure according to an embodiment of the present disclosure. FIG. 28 is a graph showing an air permeability of a separator structure according to an embodiment of the present disclosure. In addition, FIG. 29 is a graph showing a peel strength of a separator structure according to an embodiment of the present disclosure.

Figure 29:
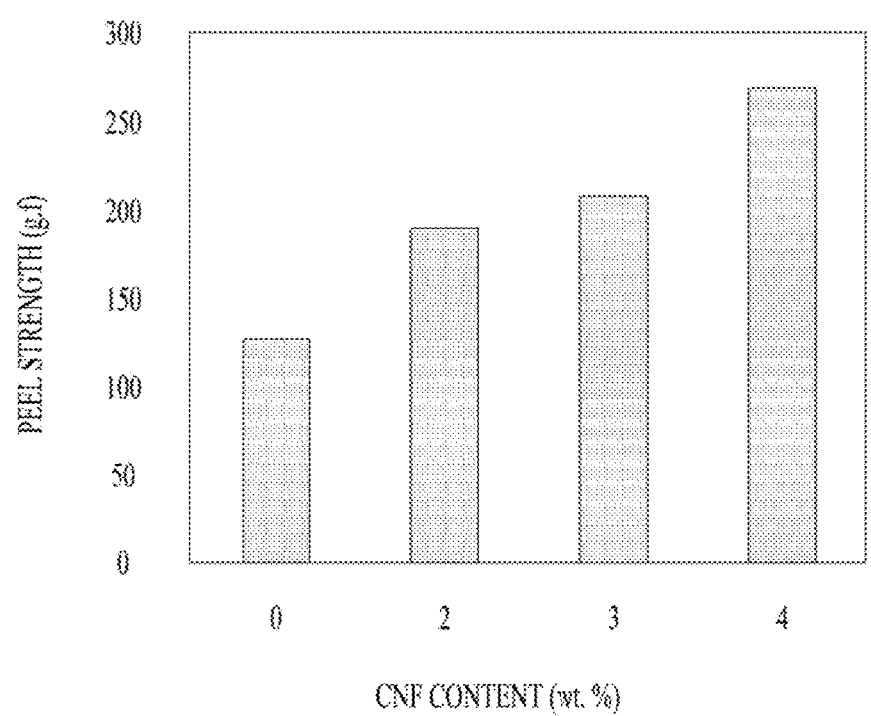
FIG. 29 is a graph showing a peel strength of a separator structure according to an embodiment of the present disclosure.

Data shown in FIGS. 27 to 29 is based on the structure of the separator 100 according to the first embodiment. The data shown in FIGS. 27 to 29 represent each of characteristics based on the content of the cellulose nano fiber 121.

Table 1 shows each of the characteristics based on the content of the cellulose nano fiber 121 as a table.

TABLE 1

| CNF content (wt. %) | Thermal contraction percentage (%) | Air permeability (s/100 cm$^3$) | Peel strength (g · f) | Impregnation property (mm) |
|---|---|---|---|---|
| 0 | 54.4 | 35 | 127.7 | 2.4 |
| 2 | 10.0 | 50 | 191.3 | 2.2 |
| 3 | 7.5 | 65 | 208.8 | 1.8 |
| 4 | 3.8 | 92.6 | 272.3 | — |

Hereinafter, the characteristic of the separator structure according to an embodiment of the present disclosure will be described with reference to FIGS. 27 to 29 and Table 1.

The characteristics, that is, a thermal contraction percentage, an air permeability, a peel strength, and an impregnation property were respectively measured based on following criteria.

Thermal contraction percentage: a degree of shrinkage of the film after being left at 150 degrees for 30 minutes.

Air permeability: Measures a time it takes for 100 cc of air to pass through the separator.

Peel strength: measured on 100 N of a load cell

Impregnation property: After filling a 10 μl syringe with 2 μl, which is a fixed quantity, of polycarbonate (PC), drop polycarbonate (PC) on the separator and then measure a distance of diffusion outward of the droplet 5 minutes later.

Referring to Table 1, it may be seen that as the content of the cellulose nano fiber 121 increases, the thermal contraction percentage remarkably decreases, and the peel strength remarkably increases. In addition, it may be seen that the air permeability is improved. On the other hand, it may be seen that the impregnation property shows a tendency to decrease finely.

As described above, according to an embodiment of the present disclosure, the high temperature thermal contraction percentage and the mechanical strength, which are important characteristics of the secondary battery, may be remarkably ameliorated.

Figure 30:
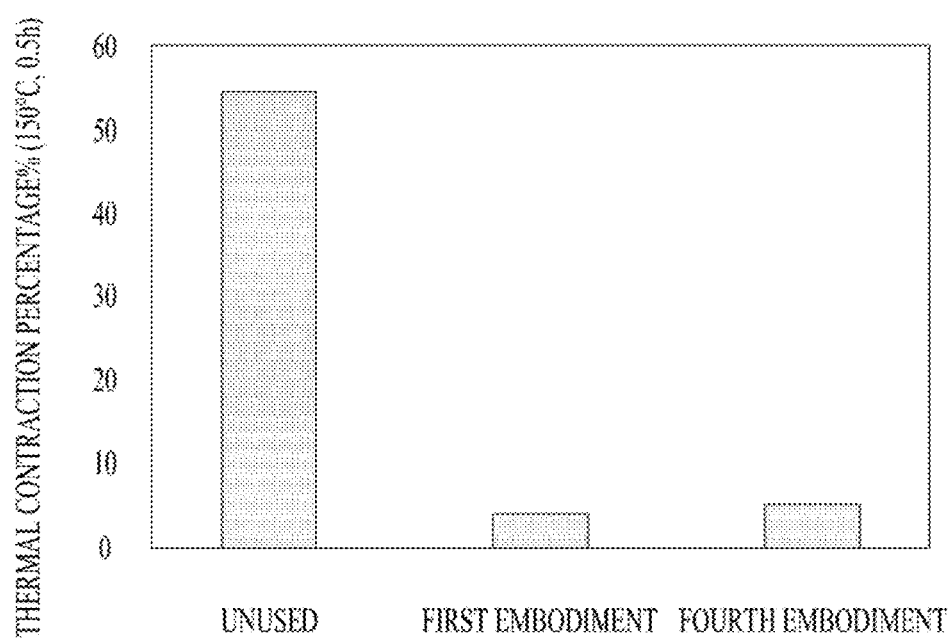
FIG. 30 is a graph showing thermal contraction percentages of separator structures according to first and fourth embodiments of the present disclosure.

FIG. 30 is a graph showing thermal contraction percentages of separator structures according to first and fourth embodiments of the present disclosure.

In addition, Table 2 shows the thermal contraction percentages of the separator structures according to the first and fourth embodiments in a table.

TABLE 2

| Sample preparation CNF | Evaluation 150° C., 0.5 h Thermal contraction percentage (%) |
|---|---|
| PE (Bare fabric) | 54.4 |
| First embodiment | 4 |
| Fourth embodiment | 5 |

Referring to FIG. 30 and Table 2, it may be seen that in a case in which the cellulose nano fiber 121 to which the ionic functional group is given according to the embodiment of the present disclosure is not used (a bare fabric), the thermal contraction percentage reaches 54.5%. However, in a case in which the cellulose nano fiber 121 to which the ionic functional group is given according to the embodiment of the present disclosure is used, the thermal contraction percentage is significantly reduced to 4 or 5%.

As described above, it may be seen that, also in the fourth embodiment, which is the case in which the inorganic particles 122 are not used and the cellulose nano fiber 121 is used alone, the thermal contraction percentage is greatly reduced to 5%. Therefore, the high temperature durability may be secured even when the cellulose nano fiber 121 is used alone.

According to the embodiment of the present disclosure described above, all preparation processes are performed in the aqueous solution and are harmless to an environment. In addition, all ion treatment and nano-ization processes may be performed in an aqueous solution at a low temperature in a range from a room temperature to about 80° C. In addition, such low temperature process has an advantage of short preparation time.

The adhesion between the support body 110 containing a hydrophobic fabric and the coating layer 120 may be secured by surface charges of the ion-treated cellulose nano fiber. In other words, because the cellulose nanofiber to which the surface charges are given by the ion surface treatment has excellent adhesion to the polyolefin-based support body 110, the mechanical performance such as the peel strength may be secured without additional complex hydrophobic surface treatment.

In addition, the structure in which the coating layer 120 containing the cellulose nano fiber 121, the inorganic particles 122, and the polymer binder 123 is formed on the porous polyolefin-based support body 110 according to an embodiment of the present disclosure may secure uniform pore distribution of the support body 110 through composition control of the coating layer 120. Therefore, the closing function of the separator 100 may be implemented, and continuous processes are possible in terms of a preparation process, thereby having an advantage of excellent productivity.

Figure 31:
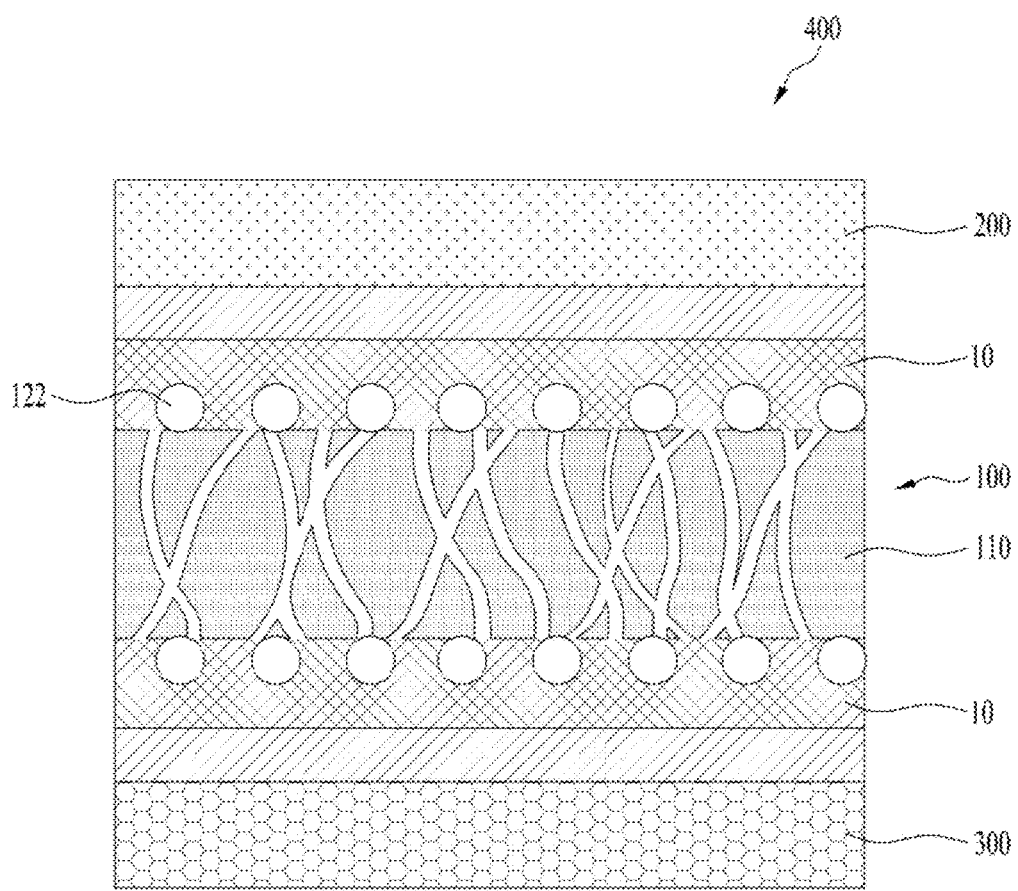
FIG. 31 is a schematic cross-sectional view showing a secondary battery including a separator structure according to an embodiment of the present disclosure.

FIG. 31 is a schematic cross-sectional view showing a secondary battery including a separator structure according to an embodiment of the present disclosure.

Referring to FIG. 31, a structure of a secondary battery 400 is schematically shown. Such secondary battery 400 may include a positive electrode 200, a negative electrode 300, a separator 100 positioned between the positive electrode 200 and the negative electrode 300, and electrolytes 10 respectively positioned between the positive electrode 200 and the separator 100 and between the negative electrode 300 and separator 100. In this connection, the electrolyte 10 may include a liquid electrolyte or a solid electrolyte.

As described above, the separator 100 may include the porous support body 110 including the first face and the second face, and the cellulose nano fiber 121 that has been subjected to the ion surface treatment located on at least one of the first and second faces of the support body 110.

In addition, the separator 100 may contain the inorganic particles 122 and the binder having at least one face connected to the cellulose nano fiber 121.

As such, the secondary battery 400 is composed of the electrodes 200 and 300, the separator 100, and the electrolytes 10. The components may be stacked in an order of the positive electrode 200, the separator 100, and the negative electrode 300 by a cell capacity.

The secondary battery may be manufactured in a pouch or cylindrical shape depending on a cell shape, and may be manufactured through electrolyte injection after cell assembly.

For example, the positive electrode 200 may be made of aluminum and the negative electrode 300 may be made of copper. In this case, the positive electrode 200 may be prepared by applying an active material slurry to the aluminum, and the negative electrode 300 may be prepared by applying the active material slurry to a copper foil metal current collector plate.

In detail, positive electrode active material slurry may be prepared by mixing a powder type active material, a PVDF binder, and a conductive material with an NMP solvent.

In a case of artificial graphite, the binder and the NMP solvent are used for negative active material slurry. In a case of natural graphite, the negative active material slurry may be prepared with the water-based binder, a surfactant, and the water as a solvent.

An electrolyte may be composed of a lithium salt, a solvent, and an additive. In this connection, as the lithium salt, $LiPF_6$, $LiBF_4$, $LiAsF_6$, $LiClO_4$, $LiCF_3SO_3$, and the like may be used. In addition, as the solvent, ethylene carbonate (EC), propylene carbonate (PC), dimethyl carbonate (DCM), dimethyl carbonate (DEC), ethylmethyl carbonate (ECM), and the like may be used alone or in combination.

Such a secondary battery may have the technical effects described above. That is, the high temperature durability of the secondary battery may be ensured, and the mechanical strength thereof may be improved. In summary, the embodiment of the present disclosure has following effects.

First, the adhesion between the support body containing the hydrophobic fabric and the coating layer may be secured by the surface charges of the ion-treated cellulose nano fiber.

In other words, because the cellulose nanofiber to which the surface charges are given by the ion surface treatment has the excellent adhesion to the polyolefin-based support body, the mechanical performance such as the peel strength may be secured without the additional complex hydrophobic surface treatment.

In addition, in the separator structure according to the embodiment of the present disclosure, the thermal contraction percentage is remarkably reduced at the high temperature by the adhesion of the cellulose nano fiber to which the surface charges are given by the ion surface treatment, so that the heat resistance may be improved.

In addition, the uniform pore distribution in the support body may be secured by controlling the composition of the coating layer containing the cellulose nano fiber.

In one example, in terms of the preparation process, the productivity is excellent as the preparation in the low-temperature aqueous solution and the continuous processes are possible.

According to the embodiment of the present disclosure, all the preparation processes are performed in the aqueous solution and are harmless to the environment. In addition, all ion treatment and nano-scale processes may be performed in the aqueous solution at the low temperature in the range from the room temperature to about 80° C. In addition, such low temperature process has an advantage of the short preparation time.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

What is claimed is:

1. A separator structure disposed inside a secondary battery, the separator comprising:
    a porous support body including a first face and a second face; and
    a coating layer disposed on at least one of the first face or the second face of the support body,
    wherein the coating layer includes:
    a first layer of cellulose nano fibers comprising an ionic surface treatment located on at least one of the first face or the second face of the support body; and
    a second layer of inorganic particles at least partially in contact with the cellulose nano fibers,
    wherein the first layer and the second layer are at least partially positioned to be distinguished from each other.

2. The separator structure of claim 1, wherein the cellulose nano fibers comprising the ionic surface treatment are a cellulose nano fiber with an ionic functional group given thereto.

3. The separator structure of claim 2, wherein the ionic functional group improves affinity between the cellulose nano fibers and the support body.

4. The separator structure of claim 2, wherein a reaction amount of the ionic functional group to the cellulose nano fibers is in a range from 5 to 30%.

5. The separator structure of claim 1, wherein the inorganic particles include at least one selected from a group consisting of $Al_2O_3$, $BaTiO_3$, $SiO_2$, $TiO_2$, and $SnO_2$.

6. The separator structure of claim 1, wherein the cellulose nano fibers comprising the ionic surface treatment have a positive ion group, a negative ion group, or a zwitterionic group.

7. The separator structure of claim 6, wherein the positive ion group includes an amine group.

8. The separator structure of claim 6, wherein the negative ion group includes a carboxyl group.

9. The separator structure of claim 1, further containing a binder for attaching the cellulose nano fibers on at least one of the first face or the second face of the support body.

10. The separator structure of claim 1, wherein the cellulose nano fibers have a crystallinity in a range from 40 to 60%.

11. A separator structure comprising:
    a porous support body having at least one face coated with a dry coating composite,
    wherein the dry coating composite contains 1 to 10 wt % of a cellulose nano fiber comprising an ionic surface treatment with an ionic functional group given thereto, inorganic particles having a permittivity constant equal to or higher than 5, and a binder, and
    wherein the cellulose nano fibers comprising the ionic surface treatment have a positive ion group or a zwitterionic group,
    wherein the dry coating includes:
    a first layer of the cellulose nano fibers comprising the ionic surface treatment located on at least one of the first face or the second face of the support body; and a second layer of the inorganic particles at least partially in contact with the cellulose nano fibers,
wherein the first layer and the second layer are at least partially positioned to be distinguished from each other.

12. The separator structure of claim 11, wherein the ionic functional group improves affinity between the cellulose nano fiber and the support body.

13. The separator structure of claim 11, wherein a reaction amount of the ionic functional group to the cellulose nano fiber is in a range from 5 to 30%.

14. The separator structure of claim 11, wherein a portion of the inorganic particles form a network with particles of the cellulose nano fiber.

15. The separator structure of claim 11, wherein the inorganic particles include at least one selected from a group consisting of $Al_2O_3$, $BaTiO_3$, $SiO_2$, $TiO_2$, and $SnO_2$.

16. The separator structure of claim 11, wherein the positive ion group includes an amine group.

17. The separator structure of claim 12, wherein the cellulose nano fiber has a crystallinity in a range from 40 to 60%.

18. A secondary battery comprising:
a positive electrode;
a negative electrode;
a separator including a porous support body positioned between the positive electrode and the negative electrode and including a first face and a second face, and a first layer of cellulose nano fibers subjected to comprising an ionic surface treatment positioned on at least one of the first or second faces of the support body, a second layer of inorganic particles at least partially in contact with the cellulose nano fibers, wherein the first layer and the second layer are at least partially positioned to be distinguished from each other; and
electrolytes respectively located between the positive electrode and the separator and between the negative electrode and the separator.

19. A method for preparing a separator, the method comprising:
obtaining a coating solution composite containing a cellulose nanofiber with an ionic functional group given thereto, inorganic particles having a permittivity constant equal to or higher than 5, and a binder; and
coating the coating solution composite on a support body.

20. The method of claim 19, wherein the inorganic particles form a network with particles of the cellulose nano fiber.

21. The method of claim 19, wherein the ionic functional group improves affinity between the cellulose nano fiber and the support body.

22. The method of claim 19, wherein a reaction amount of the ionic functional group to the cellulose nano fiber is in a range from 5 to 30%.

23. The method of claim 19, wherein the cellulose nano fiber with an ionic functional group given thereto has a positive ion group, a negative ion group, or a zwitterionic group.

24. The method of claim 23, wherein the positive ion group includes an amine group.

25. The method of claim 23, wherein the negative ion group includes a carboxyl group.

26. The method of claim 19, wherein the cellulose nano fiber has a crystallinity in a range from 40 to 60%.

27. The separator structure of claim 1, wherein the first layer contacts at least one of the first face or the second face of the support body.

28. The separator structure of claim 11, wherein the first layer contacts at least one of the first face or the second face of the support body.

* * * * *